US009113290B2

(12) United States Patent
 Bhalla

(10) Patent No.: US 9,113,290 B2
(45) Date of Patent: Aug. 18, 2015

(54) METHODS AND APPARATUS FOR ACCOUNTING AT HOME AGENT (HA) / LOCAL MOBILITY AGENT (LMA) FOR CDMA2000 SYSTEMS

(75) Inventor: Rajesh Bhalla, Gahanna, OH (US)

(73) Assignee: ZTE (USA) Inc., Richardson, TX (US)

(*) Notice: Subject to any disclaimer, the term of this patent is extended or adjusted under 35 U.S.C. 154(b) by 637 days.

(21) Appl. No.: 13/357,447

(22) Filed: Jan. 24, 2012

(65) Prior Publication Data
US 2012/0190337 A1    Jul. 26, 2012

Related U.S. Application Data

(60) Provisional application No. 61/436,159, filed on Jan. 25, 2011, provisional application No. 61/467,960, filed on Mar. 25, 2011, provisional application No. 61/569,201, filed on Dec. 9, 2011.

(51) Int. Cl.
| | |
|---|---|
| *H04M 1/66* | (2006.01) |
| *H04W 8/02* | (2009.01) |
| *H04W 8/08* | (2009.01) |
| *H04W 36/14* | (2009.01) |
| *H04W 60/00* | (2009.01) |

(52) U.S. Cl.
CPC .............. *H04W 8/02* (2013.01); *H04W 8/085* (2013.01); *H04W 36/14* (2013.01); *H04W 60/00* (2013.01)

(58) Field of Classification Search
CPC ... H04W 4/24; H04W 24/00; H04W 36/0011; H04W 36/0016; H04W 60/005; H04W 8/18; H04W 8/26; H04W 12/06; H04W 76/027
USPC .................................................. 455/405, 406
See application file for complete search history.

(56) References Cited

U.S. PATENT DOCUMENTS

| | | | |
|---|---|---|---|
| 7,366,136 B1 * | 4/2008 | Kalbag et al. ................. | 370/329 |
| 2004/0022212 A1 | 2/2004 | Chowdhury et al. | |
| 2004/0048600 A1 | 3/2004 | Madour et al. | |
| 2004/0106393 A1 | 6/2004 | Chowdhury et al. | |
| 2011/0128913 A1 * | 6/2011 | Chowdhury et al. ......... | 370/328 |

FOREIGN PATENT DOCUMENTS

CN        1474535 A    2/2004

OTHER PUBLICATIONS

"CAN Data Dictionary," 3GPP2, X.S0054-910-A, version 1.0, 47 pages, Aug. 2008.
"cdma2000 Wireless IP Network Standard: Accounting Services and 3GPP2 RADIUS VSAs," 3GPP2, X.S0011-005-C, version 1.0.0, 48 pages, Aug. 2003.
"Clarifications related to the use of terms 'accounting' and 'charging' in Section 6," 3GPP2, X.P0062 RnF Comment, 7 pages, Sep. 2010.
"Interoperability Specification (IOS) for cdma2000 Access Network Interfaces—Part 1 Overview," 3GPP2, A.S0011-C, version 2.0, 28 pages, Dec. 2005.
"PCC for cmda2000 1x and HRPD Networks," 3GPP2, X.S0062-0, version 1.0, 94 pages, Oct. 2010.

* cited by examiner

*Primary Examiner* — Kwasi Karikari
(74) *Attorney, Agent, or Firm* — Perkins Coie LLP

(57) ABSTRACT

Techniques for facilitating wireless communications include receiving a registration request (such as a mobile internet protocol MIP registration request, and transmitting, based on the received registration request, an accounting message indicating support of an accounting mode. The accounting mode may, for example, include performing accounting for a mobile station at a packet data serving node (PDSN) that is serving the mobile station.

46 Claims, 12 Drawing Sheets

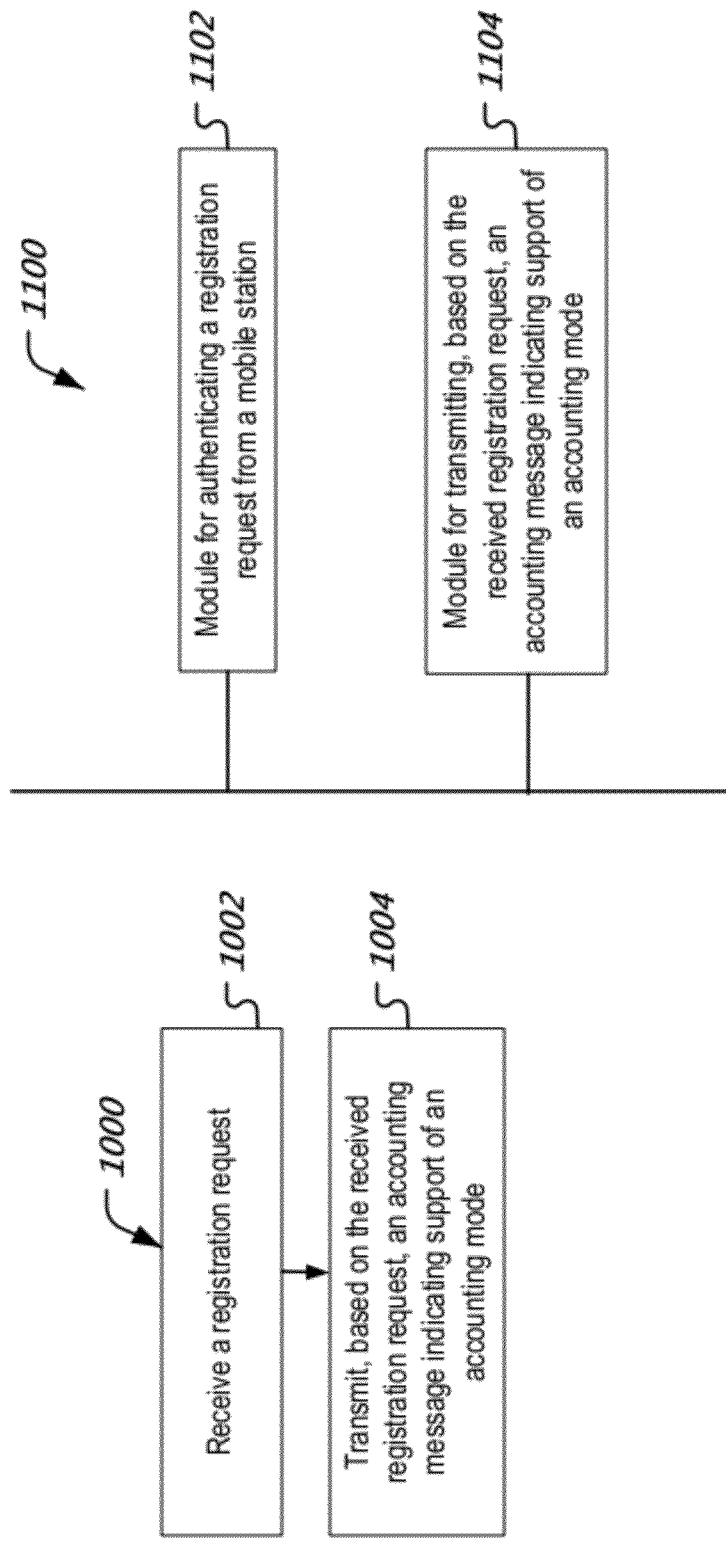

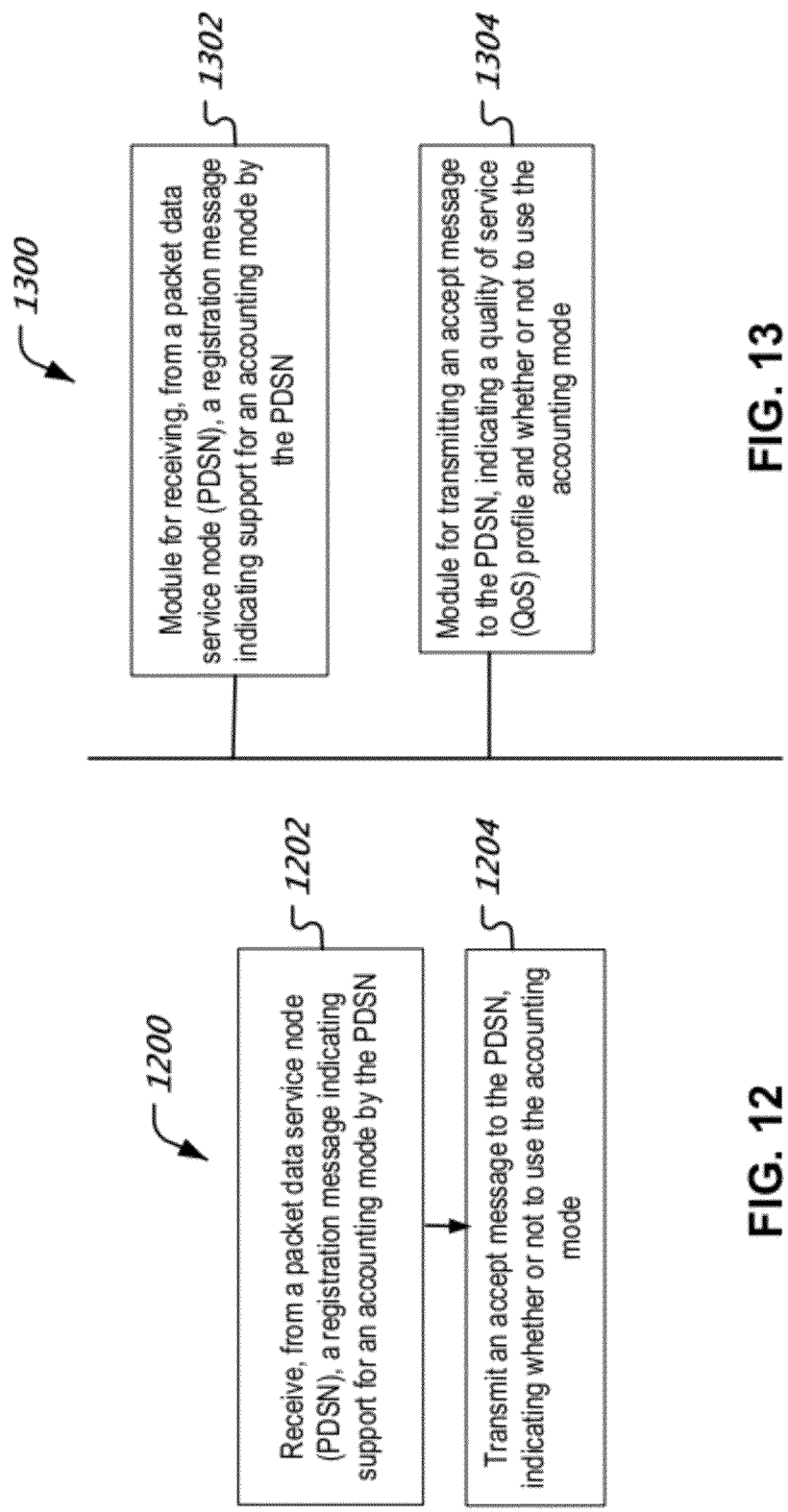

US 9,113,290 B2

METHODS AND APPARATUS FOR ACCOUNTING AT HOME AGENT (HA) / LOCAL MOBILITY AGENT (LMA) FOR CDMA2000 SYSTEMS

CROSS REFERENCE TO RELATED APPLICATIONS

This patent document claims the benefit of priority of U.S. Provisional Patent Application No. 61/436,159, entitled "Accounting At HA/LMA For CDMA2000 Systems," filed on Jan. 25, 2011; U.S. Provisional Patent Application No. 61/467,960, entitled "Accounting At HA/LMA For CDMA2000 Systems," filed on Mar. 25, 2011; and U.S. Provisional Patent Application No. 61/569,201, entitled "Accounting At HA/LMA For CDMA2000 Systems," filed on Dec. 9, 2011.

The entire contents of the above referenced provisional patent applications are incorporated by reference as a part of this patent document.

BACKGROUND

This patent document relates to wireless communications, wireless communication devices, wireless communications systems and related methods.

Wireless communication systems can include a network of one or more base stations to communicate with one or more wireless devices such as a mobile device, cell phone, wireless air card, mobile station (MS), user equipment (UE), access terminal (AT), or subscriber station (SS). Each base station can emit radio signals that carry signaling and data such as voice data and other data content to wireless devices. A base station can be referred to as an access point (AP) or access network (AN) or can be included as part of an access network. A wireless communication system can include one or more radio access network controllers to control one or more base stations. Examples of various wireless technologies include Long-Term Evolution (LTE), Code division Multiple Access (CDMA) such as CDMA2000 1x, and High Rate Packet Data (HRPD).

Techniques are needed for enabling accounting of data connections of mobile devices operating in a packet data network.

SUMMARY

This document describes technologies, among other things, for accounting of packet data connections in wireless communications networks.

In one aspect, a method for accounting management in wireless communications includes receiving a registration request and transmitting, based on the received registration request, an accounting message indicating support of an accounting mode In another aspect, a method of accounting management in wireless communications includes receiving, from a packet data service node (PDSN), a registration message indicating support for an accounting mode by the PDSN and transmitting an accept message to the PDSN, indicating whether or not to use the accounting mode.

In yet another aspect, a method of accounting management in wireless communications includes receiving, from a packet data service node (PDSN), a registration message indicating an accounting mode to be used for a packet data connection; and transmitting a registration reply message to the PDSN, including a mobility extension field, a home address and a success code.

In yet another aspect, a system for accounting management in wireless communications comprises a packet data service node (PDSN), a home authentication, authorization and accounting (HAAA) server and a home agent/local mobility agent. The PDSN is configured to receive a registration request and transmit, based on the received registration request, an accounting message indicating support of an accounting mode. The HAAA server is configured to receive, from the PDSN, the registration request; and transmit an accept message to the PDSN, indicating whether or not to use the accounting mode. The HA/LMA is configured to receive, from the PDSN, a registration message indicating an accounting mode to be used for a packet data connection and transmit a registration reply message to the PDSN, including a mobility extension field, a home address and a success code.

The details of one or more implementations are set forth in the accompanying attachments, the drawings, and the description below. Other features will be apparent from the description and drawings, and from the claims.

BRIEF DESCRIPTION OF THE DRAWINGS

FIG. 10 is a flow chart representation of a process for facilitating wireless communications.

FIG. 11 is a block diagram representation of a portion of an apparatus for facilitating wireless communications.

FIG. 12 is a flow chart representation of a process for facilitating wireless communications.

FIG. 13 is a block diagram representation of a portion of an apparatus for facilitating wireless communications.

Like reference symbols in the various drawings indicate like elements.

DETAILED DESCRIPTION

In the description below, techniques are provided to facilitate accounting management and operations in wireless communications. In one aspect, techniques are provided to perform accounting management or calculations at a server under control of a service provider. In another aspect, messaging techniques re in negotiating a network entity responsible for performing accounting operation for packet data connections of a mobile communications device such as a user equipment (UE).

Figure 1:
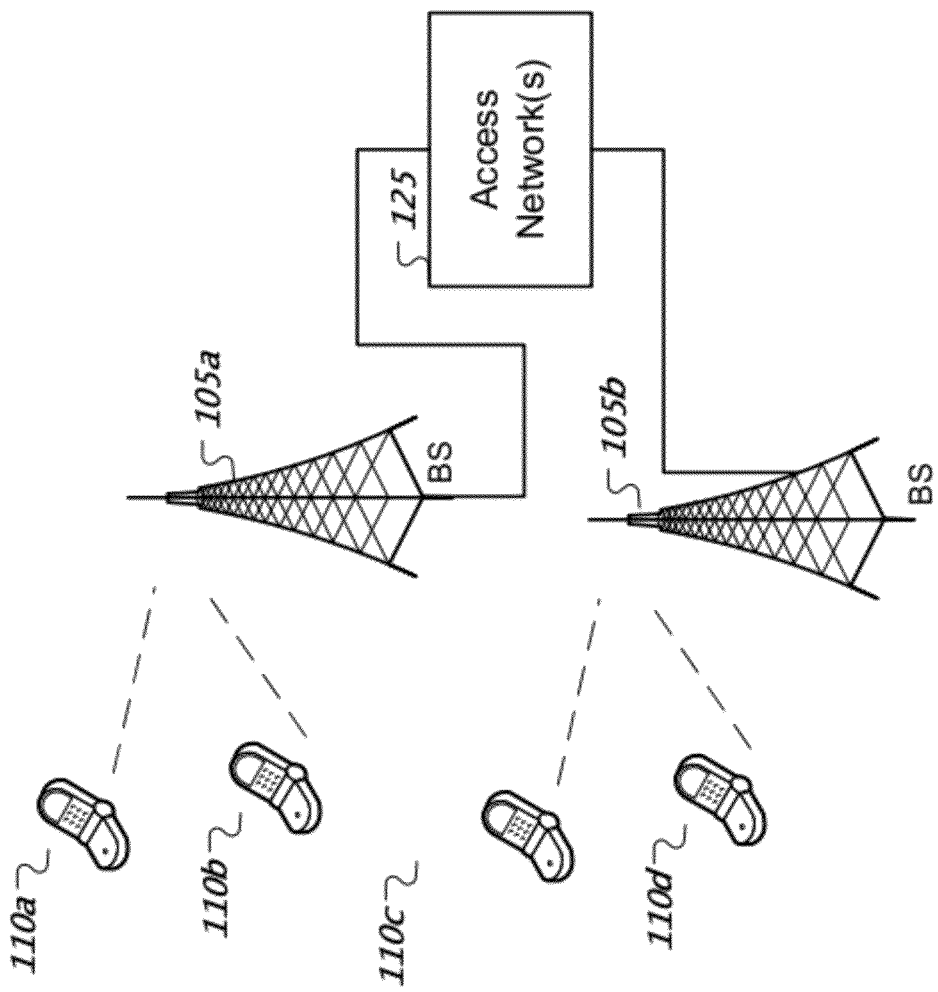
FIG. 1 shows an example of a wireless communication system.

FIG. 1 shows an example of a wireless communication system. A wireless communication system can include one or more base stations (BSs) 105, 107 and one or more wireless devices 110. A base station 105, 107 can transmit a signal on a forward link (FL), or a downlink (DL), to one or more wireless devices 110. A wireless device 110 can receive a signal from a base station via the respective forward link (FL) or a downlink (DL), and can transmit a signal on a reverse link (RL), or uplink (UL), to one or more base stations 105, 107. A wireless communication system can include one or more core networks 125 to control one or more base stations. In some implementations, a wireless communication system can include different access networks (ANs) for different radio access technologies (RATs).

Base stations 105, 107 can be configured to operate based on or use same or different wireless technologies. For example, one base station 105 can use E-UTRAN technology and a different base station 107 can use eHRPD technology. Examples of wireless communication systems that can implement the present techniques and systems include, among others, wireless communication systems based on Code Division Multiple Access (CDMA) such as CDMA2000 1x, High Rate Packet Data (HRPD), Evolved High Rate Packet Data (eHRPD), Evolved Universal Terrestrial Radio Access Network (E-UTRAN), the Worldwide Interoperability for Microwave Access (WiMAX) technology and a WiFi technology under an IEEE 802.11 standard. A wireless device 110 can be configured to use one or more RATs such as HRPD, eHRPD, and E-UTRAN.

As an example, the wireless communication system in FIG. 1 can be based on CDMA2000 as defined in 3GPP2.

Figure 2:
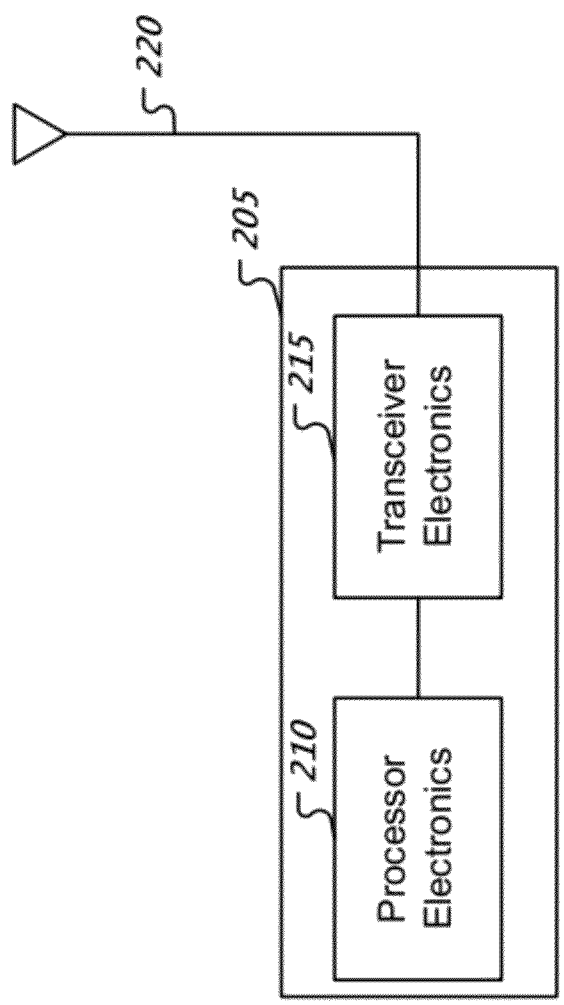
FIG. 2 shows an example of radio station architecture.

FIG. 2 shows an example radio station architecture for a wireless communication device 110 or a base station 105 or 107 in FIG. 1. A radio station 205 in this example includes processor electronics 210 such as a microprocessor that implements methods such as one or more of the wireless communication techniques presented in this document. The radio station 205 includes transceiver electronics 215 to send and/or receive wireless signals over one or more communication interfaces such as an antenna 220. The radio station 205 can include other communication interfaces for transmitting and receiving signaling and data. The radio station 205 can include one or more memories configured to store information such as data and/or instructions.

Telecommunications networks perform accounting functions for the use of their resources. The resource usage could be the use of radio resources for wireless network resource usage; and/or the use of packet data network resources for use of packet data networks usage. Such accounting information could then be used for auditing, reconciliation and billing purposes.

In a CDMA2000 system, as defined by the 3GPP2 standards committee, a mobile station user may use packet data services in the Simple IP or Mobile IP addressing modes.

Figure 3:
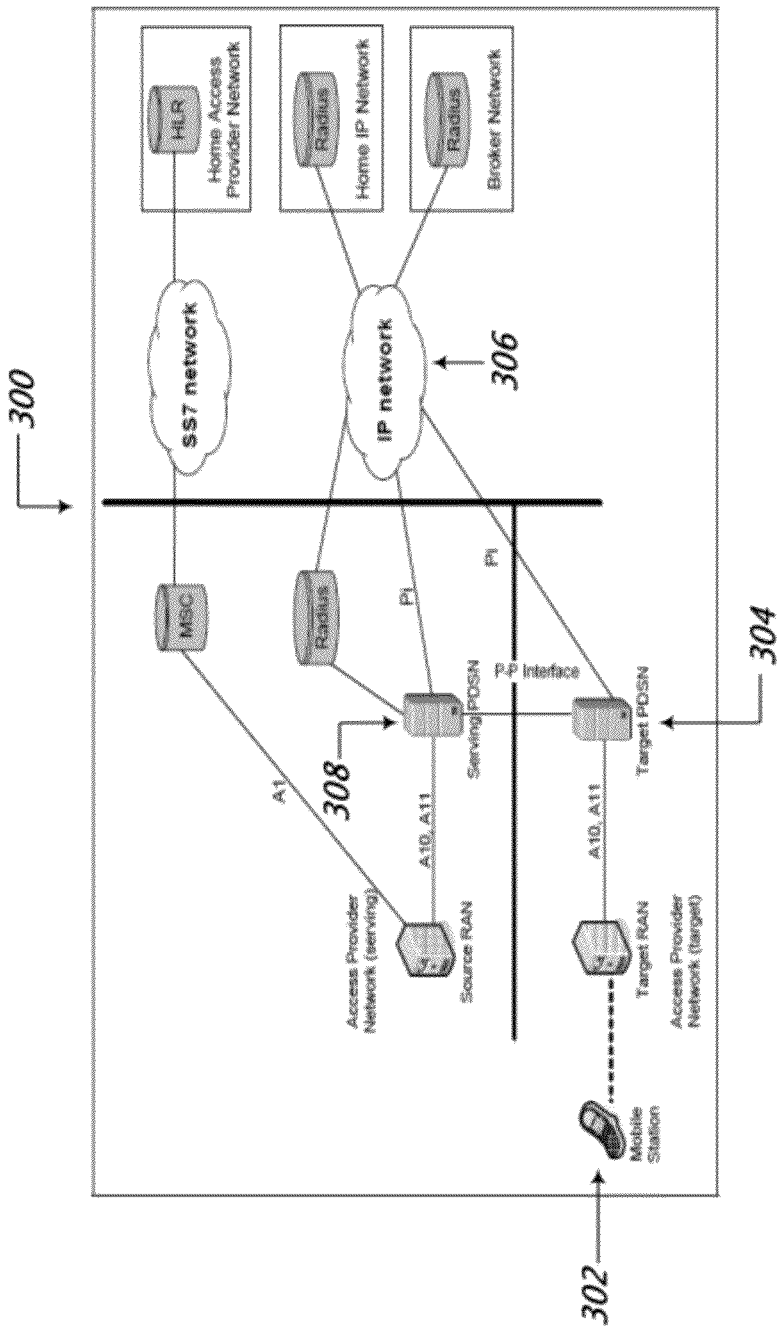
FIG. 3 is a block diagram representation of one example network in which simple internet protocol (IP) addressing is used.

FIG. 3 shows an example architectural block diagram of a communications network 300 in which a Simple IP addressing mode is used. In Simple IP addressing mode, user data packets are routed between a Mobile Station 302 (e.g. UE), the Packet Data Serving Node (PDSN) 304 and a peer-node via the IP network 306. In this addressing mode, the mobility of a mobile station 302 is limited to the coverage domain of the serving PDSN 308.

Figure 4:
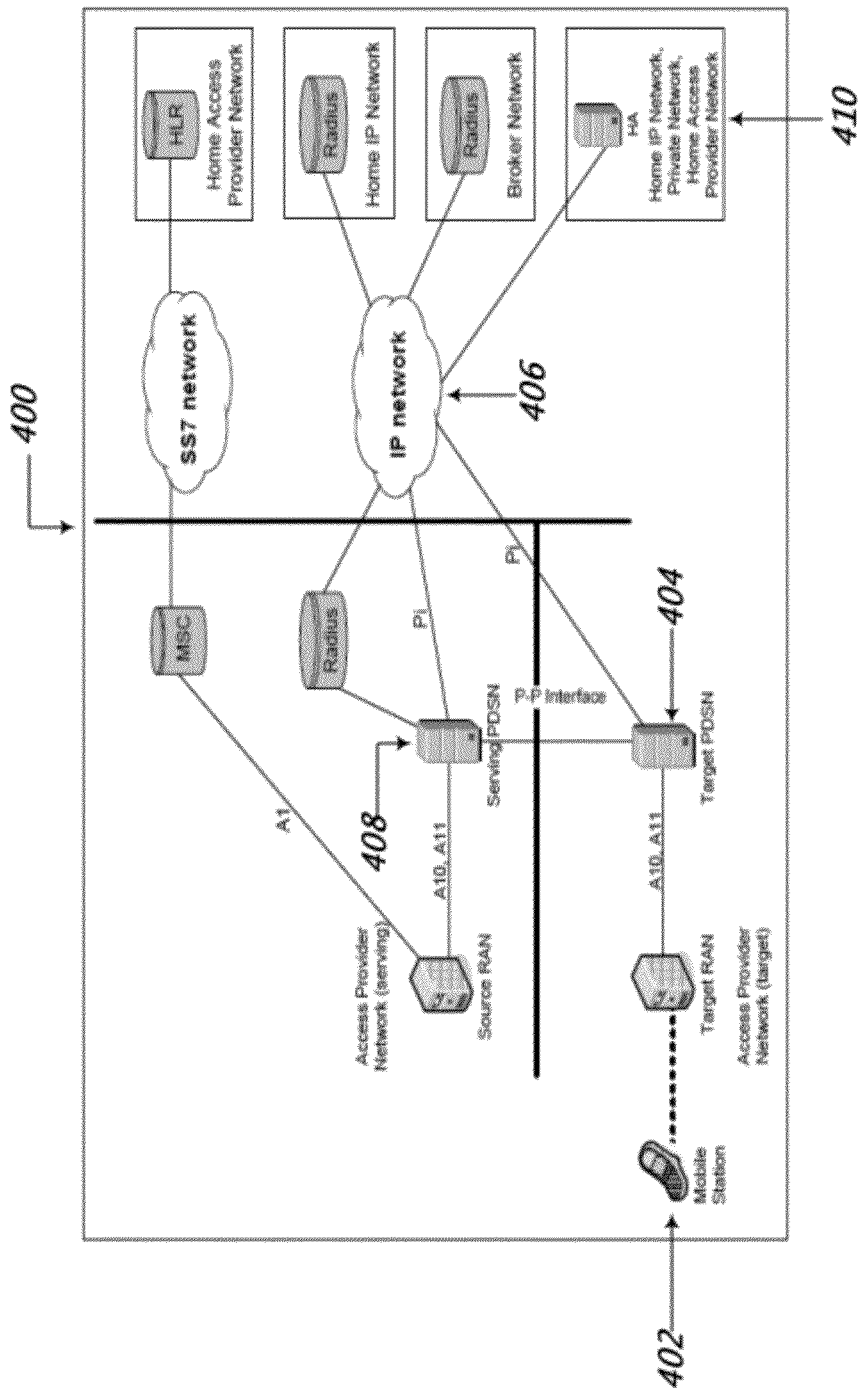
FIG. 4 is a block diagram representation of one example network in which mobile internet protocol (IP) addressing is used.

With reference to FIG. 4, an example architecture block diagram of a communications network 400 in which Mobile IP addressing mode is implemented is shown. In the Mobile IP addressing mode, user data packets are routed between the Mobile Station 402, the PDSN 404, the Home Agent/Local Mobility Anchor (HA/LMA) 410, and the peer-node via the IP network 406. The use of the Mobile IP (MIP) protocol extends the mobility across multiple PDSN coverage domains. In order to extend the mobility domain of Simple IP addressing mode, Proxy-Mobile IP (PMIP) protocol can be used between the PDSN 408 and the HA/LMA 410.

The accounting procedures defined for CDMA2000 packet data services are currently limited to accounting at the PDSN. For MIP and PMIP operation modes, packet routing is done at the HA/LMA entity. In operational scenarios, limiting accounting to the PDSN may be problematic. For example, a mobile station may be roaming into a network in which the PDSN is not controlled by the service provider for the mobile station. In such a case, the accounting PDSN may not be privy to the service provider's accounting rules and service tier for the mobile station.

Advantageously, techniques disclosed in this document could be used to perform accounting at HA/LMA. In one aspect, the disclosed techniques can be used to perform accounting at the HA/LMA for CDMA2000 systems for MIP and PMIP addressing modes. In another aspect, the techniques disclosed in this document may be used by network entities, such as the HA/LMA, the PDSN and the Packet Data Authentication and Authorization function, e.g., the RADIUS AAA server, to negotiate and communicate to all involved entities the location at which the accounting occurs.

Figure 5:
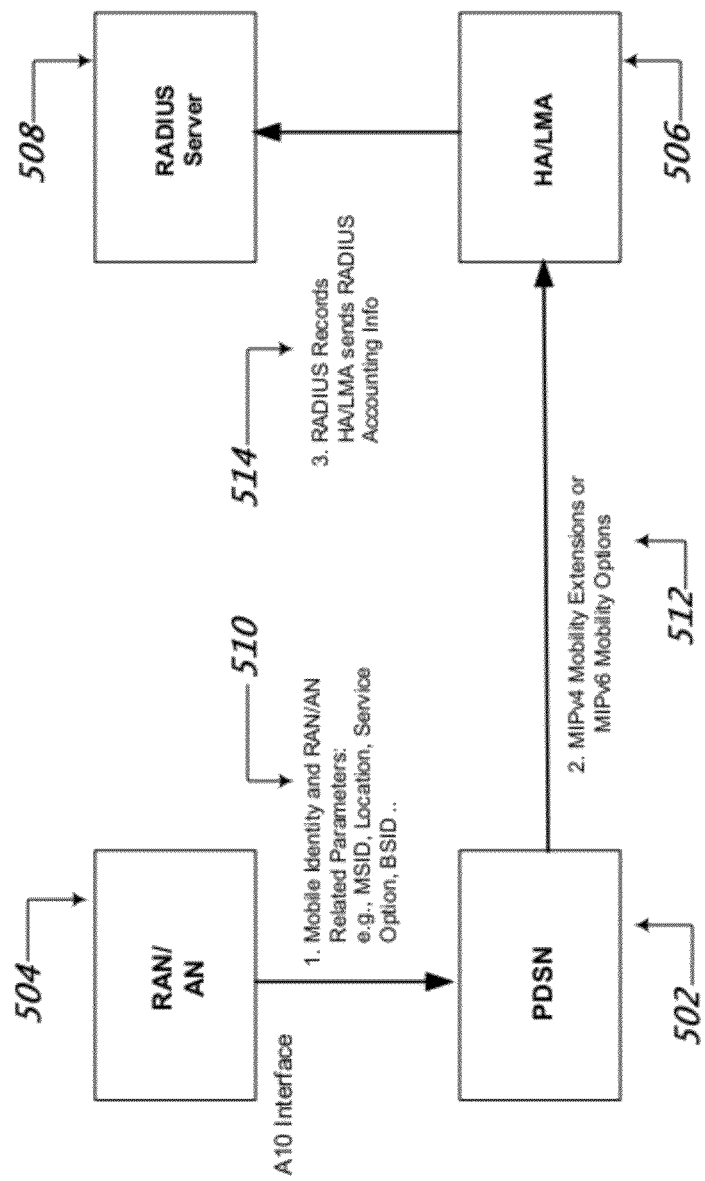
FIG. 5 is a block diagram showing an example accounting architecture for accounting at Home Agent (HA)/Local Mobility Agent (LMA).

FIG. 5 shows an example where accounting at the HA/LMA 506 is performed only on the IP network specific resource usage in some implementations. The PDSN 502 receives airlink parameters from the RAN/AN 504 at the time of the establishment of a packet data session and at the occurrence of other events, e.g., as defined in X.S0011-005 (e.g., message 510). Some airlink parameters for some of these events as specified in this document are forwarded by the PDSN to the HA/LMA 506 (e.g., message 512) for generating accounting usage detail records (UDRs). In some embodiments, for MIPv4 and PMIPv4 operation modes, the HA 506 receives mobile station identity and radio access network/ access network (RAN/AN) related parameters from the serving PDSN/FA in the form of 'mobility extensions' via MIPv4 Registration Request message (e.g., message 512). For PMIPv6 operation mode, the LMA receives mobile identity and RAN/AN related parameters as 'mobility options' from the serving PDSN/MAG (mobile access gateway) via an MIPv6 Binding Update message. The HA/LMA 506 uses RADIUS (Remote Authentication Dial In User Service) accounting messages to send UDR information to the RADIUS server 508 (e.g., message 514). This is illustrated in FIG. 5. The HA/LMA 506 maintains the UDR (usage data record) information until it receives positive acknowledgment from the RADIUS server that the RADIUS server has correctly received the RADIUS message. Likewise, the RADIUS server maintains the UDR until the record is delivered to a Home RADIUS server, or removed by the operator billing system. The method by which information is moved from a RADIUS server to a billing system is and the summary, reconciliation, and billing process used by the operators may be performed using well known techniques.

In some embodiments, the MIP Registration Request, the PMIP Registration Request and/or the PMIP Binding Update messages are used for conveying mobile station identity and RAN/AN related parameters from the PDSN 502 to the HA/LMA 506. In other implementations, such information could be conveyed from the PDSN 502 to the HA/LMA 506 by the use of any other suitable messaging scheme between the PDSN 502 and the HA/LMA 506. Examples of such other messaging schemes would be, but not limited to the use of AAA RADIUS messages and associated Attributes or AAA Diameters messages and associated AVPs.

Figure 6:
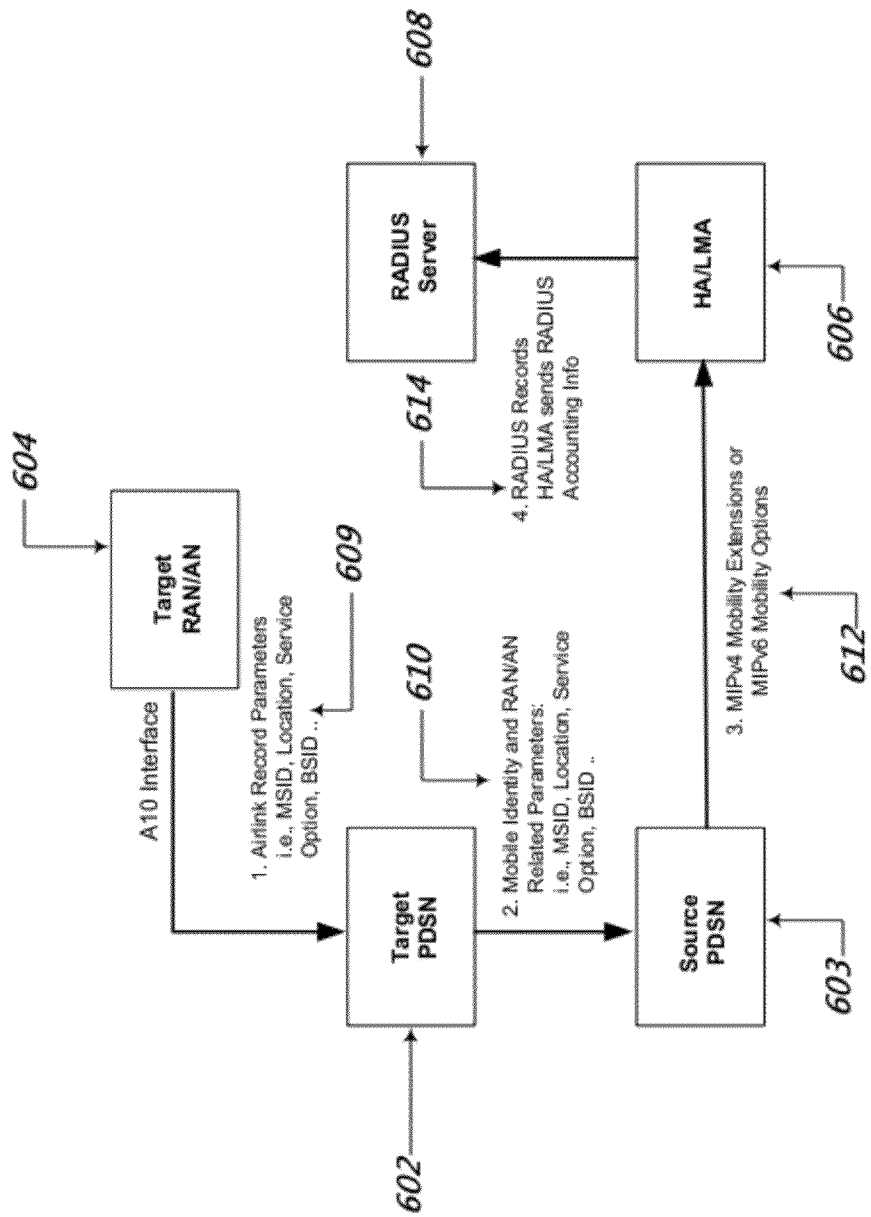
FIG. 6 is a block diagram showing an example accounting architecture for accounting at Home Agent (HA)/Local Mobility Agent (LMA) for a fast handoff.

With reference to FIG. 6, in some embodiments, as specified in X.S0011-005, if a peer to peer (P-P) session exists, the Target PDSN 602 forwards the airlink records received from the Target RAN to the Serving PDSN over the P-P interface (e.g., messages 609 and 610). The Target PDSN 602 does not alter the airlink records. The Serving PDSN 603 uses the airlink records received from the Target PDSN for obtaining mobile station identity and packet data session related parameters and forwards them to the HA/LMA 606 in mobility extensions/mobility options (e.g., message 612). The HA/LMA 606 uses such information for generating accounting UDRs. The Serving PDSN 603 continues to perform accounting as negotiated with the HA/LMA 606. The HA/LMA 606 is also communicatively coupled to the RADIUS server 608 and may send RADIUS accounting information (e.g., message 614) to the RADIUS server 608. FIG. 6 illustrates the accounting architecture with accounting at the HA/LMA 606 for fast handoff.

In some embodiments, the MIP Registration Request, the PMIP Registration Request and/or the PMIP Binding Update messages are used for conveying mobile station identity and RAN/AN related parameters from the PDSN 603 to the HA/LMA 606 (message 612). However, the information could be conveyed from the PDSN 603 to the HA/LMA 606 by the use of any other suitable messaging scheme between the PDSN 603 and the HA/LMA 606. Examples of such other messaging schemes would be, but not limited to the use of AAA RADIUS messages and associated Attributes; or AAA Diameters messages and associated AVPs.

Figure 7:
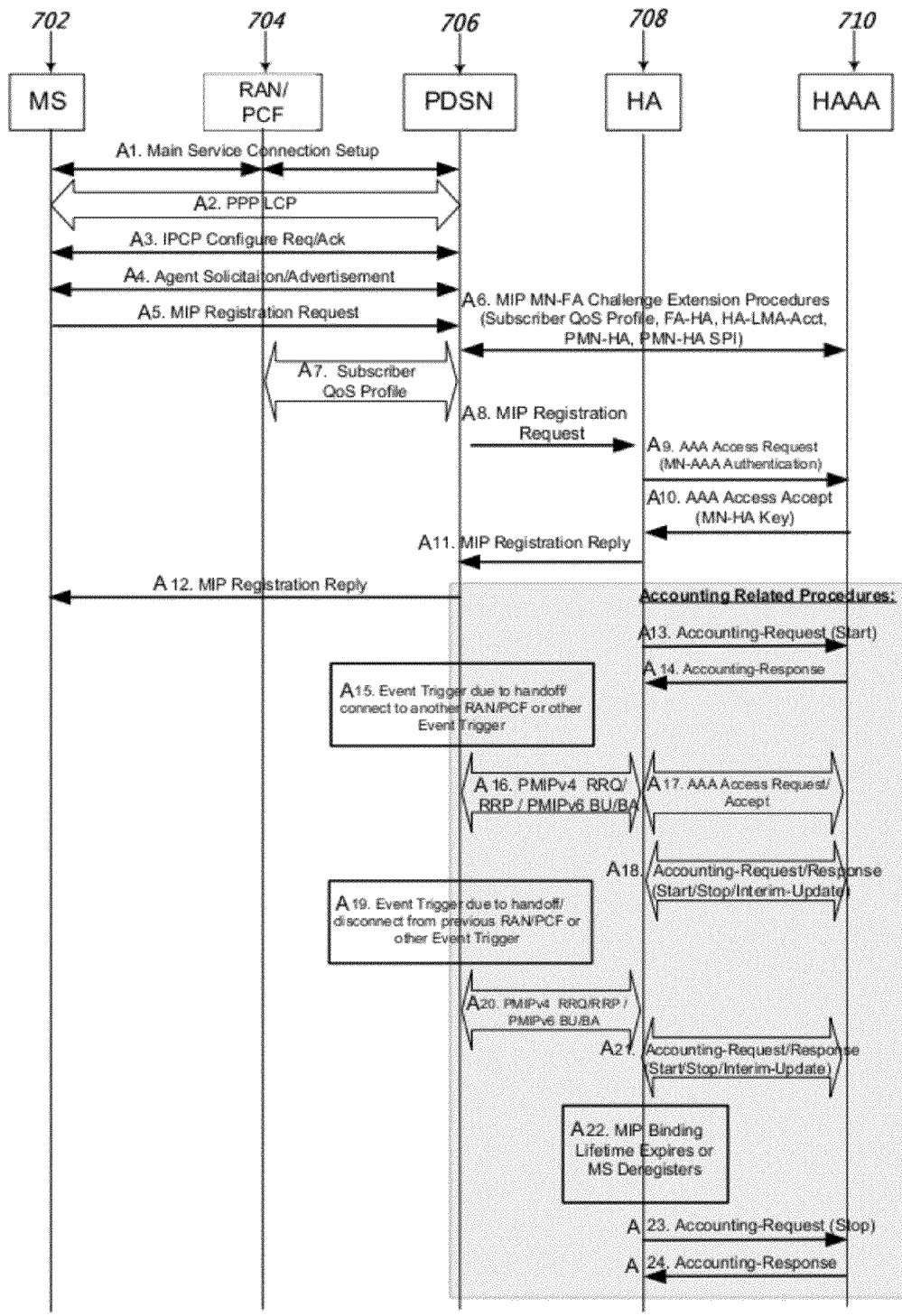
FIG. 7 is a block diagram showing example messages exchanged for accounting at HA for Mobile IPv4 operation.

FIG. 7 shows an example of accounting procedures at Home Agent (HA 708) for Mobile IPv4 operation. The call flow illustration in FIG. 7 shows the use of MIP Registration Request, PMIP Registration Request and/or PMIP Binding Update messages for conveying mobile station identity and RAN/AN related parameters from the PDSN to the HA/LMA. This information could be conveyed from the PDSN 706 to the HA/LMA 708 by the use of any other suitable messaging scheme between the PDSN 706 and the HA/LMA 708. Examples of such other messaging schemes would be, but not limited to the use of AAA RADIUS messages and associated Attributes; or AAA Diameters messages and associated AVPs.

With reference to the message arrows depicted in FIG. 7, various example embodiments of the messages exchanged are described below.

A1. The Main Service Connection is set up, with communication among MS 702, radio access network/packet control function (RAN/PCF) 704 and PDSN 706.

A2. Point-to-Point Protocol (PPP) Link Control Protocol (LCP) negotiation occurs and authentication protocol is selected.

A3. The MS 702 and the PDSN 706 perform Internet Protocol Control Protocol (IPCP) procedures. For MIPv4 only, the MS 702 does not include the IP Address Configuration Option in the IPCP Configuration-Request message to the PDSN 706.

A4. The PDSN 706 begins transmission of an operator configurable number of Agent Advertisements following establishment or re-negotiation of the PPP, or upon receipt of an Agent Solicitation message from the MS 702.

A5. The MS 702 sends a MIPv4 Registration Request message to the PDSN 706 that includes MN-FA Challenge Extension (e.g., RFC 3012). Appropriate settings of the HoA and HA fields are used for dynamic Home Address and Home Agent assignment.

A6. On initial mobile access, the PDSN 706 authenticates and authorizes the MS 702 with the HAAA 710 using FAC authentication information by the use of AAA Access Request/Accept messages. If the PDSN supports Accounting at the HA/LMA 708, the PDSN 706 includes HA-LMA-Accounting-Mode RADIUS VSA with value set to 'True' in the AAA Access Request message. The PDSN 706 includes PMIP-Based-Mobility VSA also in the AAA Access Request message to indicate to the HA 708 that it supports PMIPv4/v6 operation mode. The PDSN 706 does not include the PMIP-HA-Info-IPv4/6-Service VSA (X.S0061) in the Access Request message.

On successful authorization, information such as Subscriber quality of service (QoS) Profile, Home Agent Address and other information such as FA-HA key is returned to the PDSN 706 in AAA Access Accept message. If Accounting at the HA/LMA 708 is authorized for the MS 702, the HAAA 710 returns HA-LMA-Accounting-Mode RADIUS VSA with value set to 'True' in the Access Accept message. If accounting at HA/LMA 708 is not authorized for the MS 702, the HA-LMA-Accounting-Mode RADIUS VSA is not included in the Access Accept message or it is included with value set to 'False'. Depending on operator policy, in the Access Accept message the HAAA 710 returns the Supported Accounting Triggers RADIUS VSA also indicating the authorized HA/LMA 708 Accounting Triggers. The HAAA 710 also indicates network PMIP support for the MS 702 and returns PMN-HA/LMA key and PMN-HA/LMA-SPI information to the PDSN (X.S0061).

A7. The PDSN 706 passes relevant attributes received in Subscriber QoS Profile to the RAN 704.

A8. Anytime after Step A6, the PDSN 706 forwards the MIPv4 Registration Request message to the selected/assigned HA 708. In case the PDSN 706 supports Accounting at the HA/LMA 708 and the HAAA 710 authorizes Accounting at the HA/LMA for this MS (step A6), the PDSN 706 includes HA-LMA-Accounting-Mode mobility extension with value set to 'True' in the MIPv4 Registration Request message. In this case, the PDSN 706 also includes the mobility extensions specified for HA/LMA-Accounting in the MIPv4 Registration Request message, with Packet-Data-Connection-Type mobility extension set to 'Session Setup'. The mobility extension(s) added by the PDSN 706 in the MIPv4 Registration Request message are secured by the FA-HA key.

A9. At initial registration, if the HA does not have the MN-HA shared key, it retrieves the information from the HAAA 710. The HA sends an Access Request message to the HAAA 710 and the MN-AAA key used for the purpose of authentication and retrieving the MN-HA key. If the PDSN 706 includes HA-LMA-Accounting-Mode mobility extension with value set to 'True', and the HA also supports Accounting at the HA/LMA, the HA includes HA-LMA-Accounting-Mode RADIUS VSA with value set to 'True' in the Access Request message.

A10. On successful authentication, the HAAA 710 returns AAA Access Accept message to the HA that includes the MN-HA key. If Accounting at HA/LMA is authorized for the MS, the HAAA 710 returns HA-LMA-Accounting-Mode RADIUS VSA with value set to 'True' in the Access Accept message. If accounting at HA/LMA is not authorized for the MS, the HA-LMA-Accounting-Mode RADIUS VSA is not included in the Access Accept message or it is included with value set to 'False'. Depending on operator policy, the HAAA 710 returns Supported Accounting Triggers RADIUS VSA also indicating the authorized HA/LMA Accounting Triggers in the Access Accept message. The HA/LMA stores the returned HA-LMA Accounting-Mode value (True in this case) and the Supported Accounting Triggers value.

A11. The HA authenticates the MIP Registration Request received from the PDSN 706. On successful authentication, the HA stores the HA-LMA Accounting-Mode value (True in this case), and returns MIP Registration Reply message to the PDSN 706 that includes the Home Address and 'success' code. The HA includes the HA-LMA-Accounting-Mode Mobility Extension with the value received from the HAAA 710 (True in this case) in the MIP Registration Reply message. HA-LMA-Accounting VSA is secured by the FA-HA key.

A12. Upon receiving a MIP Registration Reply from the HA with successful registration indication (code 0), the PDSN 706 updates the mobility binding for the MS. The PDSN 706 sends MIP Registration Reply to the MS. The PDSN 706 stores the HA-LMA Accounting-Mode value (True in this case) received in the MIP Registration Reply message.

Note: The following procedures are applicable if Accounting at HA/LMA is supported both at the HA and the PDSN 706 and Accounting at HA/LMA is authorized for this MS. The HA 708 learns about support for such Accounting at HA/LMA at Step A11 above. The PDSN 706 learns about support for such Accounting at HA/LMA at Step A12 above.

A13. If Accounting at HA/LMA is supported for the MS (step A11), the HA constructs a UDR based on HA/LMA-Accounting mobility extensions received in step A8. The HA forwards the constructed UDR to the RADIUS server in an Accounting-Request (Start) message.

A14. The RADIUS server responds with an Accounting-Response message.

A15. An event such as a handoff to another RAN/PCF occurs resulting in the setup of a new A10 or P-P connection at the PDSN 706 for the same packet data session. The handoff could be due to intra-PDSN, inter-PDSN or a Fast Handoff. Such an event results in the change of one or more of the HA/LMA-Accounting mobility extension/option value(s). Or some other event occurs that results in the change of one or more HA/LMA-Accounting mobility extension/option value(s).

A16. Triggered by the event in Step A15, that results in the change of one or more HA/LMA-Accounting mobility extension/option value(s), the PDSN 706 sends a PMIPv4 Registration Request/PMIPv6 Binding Update message to the HA/LMA. The PDSN 706 generates MN-HA Authentication Extension based on the PMN-HA key and PMN-HA-SPI values received in step A6 above. The 3GPP2 document X.S0061 provides details on the construction of the PMIPv4 Registration Request/PMIPv6 Binding Update message. The PDSN 706 includes the HA/LMA-Accounting mobility extension(s)/option(s), whose value(s) have changed as a result of the event in step A15, in the PMIPv4 Registration Request/PMIPv6 Binding Update message. For an event trigger (step A15) due to a handoff; the Packet-Data-Connection-Type mobility extension/option is set to: 'Handoff', or 'Fast Handoff', as the case may be. For another event trigger type, appropriate setting of the Packet-Data-Connection-Type mobility extension/option value is used.

If this is the first PMIPv4 Registration Request/PMIPv6 Binding Update message, the HA/LMA authenticates the message with the HAAA 710 by performing step A17. On receiving PMN-HA/LMA key from the HAAA 710 and successfully authenticating the PRRQ/PBU (see Step A17), the HA/LMA sends PMIPv4 Registration Reply/PMIPv6 Binding Update message to the PDSN 706.

A17. The HA/LMA sends AAA Access Request to the HAAA 710 to verify the received PRRQ/PBU. The HAAA 710 retrieves the PMN-HA key using the PMN-HA-SPI and sends AAA Access Accept to the HA. The PMN-HA key and the PMN-HA-SPI are included in the AAA Access Accept message.

A18. The accounting client in the HA and the HAAA 710 RADIUS server exchange Accounting-Request/Response (Stop/Start/Interim-Update) messages as required by the accounting triggers received in step A16.

A19. An event such as a handoff occurs resulting in disconnect of an A10 or P-P connection at the PDSN 706 for the same packet data session. Such an event results in the change of one or more of the HA/LMA-Accounting mobility extension/option value(s). Or some other event occurs that results in the change of one or more HA/LMA-Accounting mobility extension/option value(s).

A20. Triggered by the event in Step A19, that results in the change of one or more HA/LMA-Accounting mobility extension/option value(s), the PDSN 706 sends a PMIPv4 Registration Request/PMIPv6 Binding Update message to the HA. The PDSN 706 generates MN-HA Authentication Extension based on the PMN-HA key and PMN-HA-SPI values received in step A6 above. 3GPP2 X.S0061 provides details on the construction of the PMIPv4 Registration Request/PMIPv6 Binding Update message. The PDSN 706 includes the HA/LMA-Accounting mobility extension(s)/option(s), whose value(s) have changed as a result of the event in step A19 in the PMIPv4 Registration Request/PMIPv6 Binding Update message. For an event trigger (step A19) due to a handoff/disconnect of an A10 or P-P connection; the Packet-Data-Connection-Type Mobility Extension/Option is set to: 'Handoff'. For another event trigger type, appropriate setting of the Packet-Data-Connection-Type Mobility Extension/Option value is used.

A21. The accounting client in the HA and the HAAA 710 RADIUS server exchange Accounting-Request/Response (Stop/Start/Interim-Update) messages as required by the accounting triggers in step A20.

A22. User session terminates due to expiry of MIP binding or explicit termination of the packet data session.

A23. The HA sends an Accounting-Request (Stop) message with Session Continue attribute set to 'False' to terminate the accounting session with the RADIUS server.

A24. RADIUS server responds with an Accounting-Response message.

It will be appreciated that the above-discussed messaging technique can be used, in one aspect, to relieve a PDSN of directly communicating with the RADIUS server regarding accounting function and usage information for a mobile station. In some embodiments, the PDSN will first send information to the HA/LMA, which in turn communicates with the RADIUS server about accounting for a mobile station. In some operational scenarios, a mobile station could be roaming into a non-service provider's wireless network. In such a case, the PDSN may not be under direct control of the service provider for the mobile station. However, the HA/LMA is still under control of the mobile station's service provider. Being able to pass the accounting information through the HA/LMA therefore, in one aspect, allows the service provider to exert a direct control on the service offered to the mobile station. As disclosed above, the PDSN and the RADIUS server may negotiate where the accounting is performed for a mobile station. In some embodiments, the RADIUS server can control whether the accounting for a mobile station occurs at the PDSN (which could be under direct control of a service provider's network or not) or at the HA/LMA (under direct control of the service provider of the mobile station).

Figure 8:
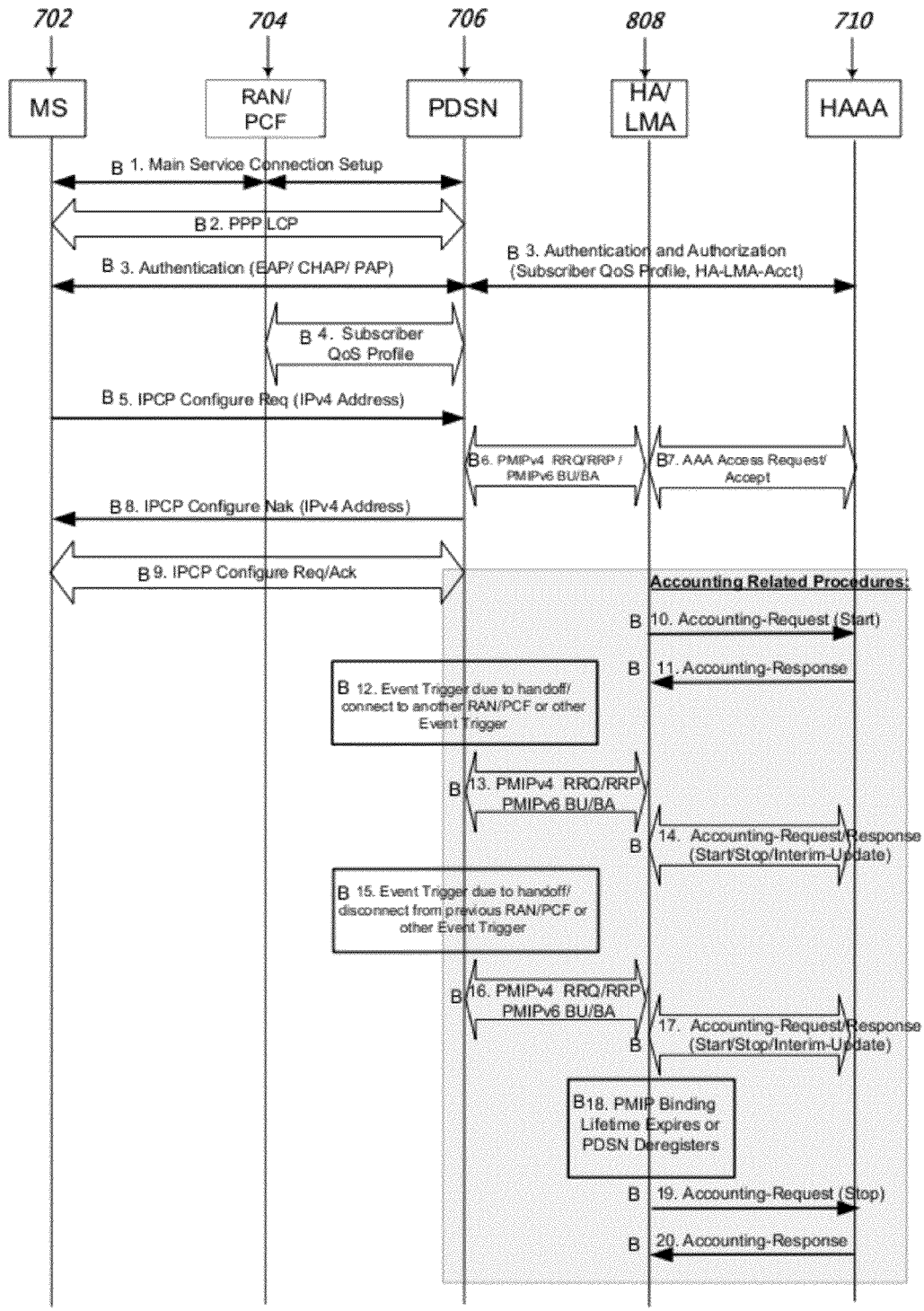
FIG. 8 is a block diagram showing example messages exchanged for accounting at HA/LMA for IPv4 addressing with Proxy Mobile Internet Protocol (MIP).

With reference to FIG. 8, example scenarios of accounting at HA/LMA for IPv4 with Proxy MIP are illustrated below.

The call flow illustration depicted in FIG. 8 shows the use of PMIP Registration Request and/or PMIP Binding Update messages for conveying mobile station identity and RAN/AN related parameters from the PDSN 706 to the HA/LMA; yet such information could be conveyed from the PDSN 706 to the HA/LMA by the use of any other suitable messaging scheme between the PDSN 706 and the HA/LMA. Examples of such other messaging schemes would be, but not limited to the use of AAA RADIUS messages and associated Attributes; or AAA Diameters messages and associated AVPs.

B1. The Main Service Connection is set up.

B2. PPP LCP negotiation occurs and authentication protocol is selected.

B3. Access authentication and authorization is performed using the selected authentication protocol. The MS 702 exchanges authentication related messages with the PDSN 706. In turn, the PDSN 706 performs authentication and authorization with the HAAA 710 using AAA Access Request/Accept messages. If the PDSN 706 supports Accounting at the HA/LMA 808, the PDSN 706 includes HA-LMA-Accounting-Mode RADIUS VSA with value set to 'True' in the AAA Access Request message.

B4. On successful authorization, information such as Subscriber QoS Profile is returned to the PDSN 706 in AAA Access Accept message. If Accounting at the HA/LMA 808 is authorized for the MS 702, the HAAA 710 returns HA-LMA-Accounting-Mode RADIUS VSA with value set to 'True' in the Access Accept message. If accounting at HA/LMA 808 is not authorized for the MS 702, the HA-LMA-Accounting-Mode RADIUS VSA is not included in the Access Accept message or it is included with value set to 'False'. Depending on operator policy, in the Access Accept message the HAAA 710 returns the Supported Accounting Triggers RADIUS VSA also indicating the authorized HA/LMA Accounting Triggers. The HAAA 710 also indicates network PMIP support for the MS 702 and returns the assigned HA/LMA address, Network-PMIP-NAI, PMN-HA key and PMN-HA-SPI information to the PDSN 706.

The PDSN 706 passes the relevant attributes received in Subscriber QoS Profile to the RAN.

B5. The MS 702 sends an IPCP Configure Request message with IP Address configuration option to the PDSN 706.

B6. The PDSN 706 generates MN-HA/LMA Authentication Extension and sends a PMIPv4 Registration Request/PMIPv6 Binding Update message to the HA/LMA 808 for establishing a PMIPv4/v6 tunnel between the PDSN 706 and the HA/LMA. 3GPP2 X.S0061 provides details on the construction of PMIPv4 Registration Request/PMIPv6 Binding Update message. In case the PDSN 706 supports Accounting at the HA/LMA 808 and the HAAA 710 authorizes Accounting at the HA/LMA for this MS 702 (step B3), the PDSN 706 includes HA-LMA-Accounting-Mode mobility extension with value set to 'True' in the PMIPv4 Registration Request/PMIPv6 Binding Update message. In this case, the PDSN 706 includes the mobility extensions/options specified for HA/LMA Accounting in the PMIPv4 Registration Request/PMIPv6 Binding Update message, with Packet-Data-Connection-Type mobility extension/option set to 'Session Setup'.

On receiving PMN-HA/LMA key from the HAAA 710 and successfully authenticating the PRRQ/PBU (see Step B7), the HA/LMA sends PMIPv4 Registration Reply/PMIPv6 Binding Acknowledgment message to the PDSN 706 that includes the IPv4 address assigned to the MS 702. In turn, the PDSN 706 passes the assigned IPv4 address to the MS 702 as per IPCP procedures performed in Steps B8 and B9. The PDSN 706 stores the HA-LMA Accounting-Mode value (True in this case) and Supported Accounting Triggers value if received in the PMIPv4 Registration Reply/PMIPv6 Binding Acknowledgment message.

B7. The HA/LMA 808 sends AAA Access Request to the HAAA 710 to verify the received PRRQ/PBU message. If the PDSN 706 includes HA-LMA-Accounting-Mode mobility extension with value set to 'True', and the HA also supports Accounting at the HA/LMA 808, the HA includes HA-LMA-Accounting-Mode RADIUS VSA with value set to 'True' in the Access Request message.

The HAAA 710 retrieves the PMN-HA/LMA key using the PMN-HA/LMA-SPI and sends AAA Access Accept to the HA/LMA 808. The PMN-HA/LMA key and the PMN-HA/LMA-SPI are included in the AAA Access Accept message. If Accounting at HA/LMA 808 is supported for the MS 702, the HAAA 710 returns HA-LMA-Accounting-Mode RADIUS VSA with value set to 'True' in the Access Accept message. If accounting at HA/LMA 808 is not authorized for the MS 702, the HA-LMA-Accounting-Mode RADIUS VSA is not included in the Access Accept message or it is included with value set to 'False'. Depending on operator policy, in the Access Accept message the HAAA 710 returns the Supported Accounting Triggers RADIUS VSA also indicating the authorized HA/LMA Accounting Triggers. The HA/LMA 808 stores the HA-LMA Accounting value (True in this case) and Supported Accounting Triggers.

B8. The PDSN 706 sends an IPCP Configure Nak message that includes the assigned IP Address received in PRRP/PBA to the MS 702.

B9. The MS 702 and the PDSN 706 continue to perform IPCP procedures for the allocation of IP Address.

In addition, the following procedures can be applicable if Accounting at HA/LMA 808 is supported both at the HA/LMA 808 and the PDSN 706 and Accounting at HA/LMA 808 is authorized for this MS 702. The HA/LMA 808 learns about support for Accounting at HA/LMA 808 at Step B7 above. The PDSN 706 learns about support for Accounting at HA/LMA 808 at Step B6 above.

B.10 If Accounting at HA/LMA 808 is supported for the MS 702 (step B7), the HA/LMA 808 constructs a UDR based on HA/LMA-Accounting mobility extensions/options received in step B6. The HA/LMA forwards the constructed UDR to the HAAA 710 RADIUS server in an Accounting-Request (Start) message.

B.11 The RADIUS server responds with an Accounting-Response message.

B.12 An event such as a handoff to another RAN/PCF 704 occurs resulting in the setup of a new A10 or P-P connection at the PDSN 706 for the same packet data session. The handoff could be due to intra-PDSN 706 or a Fast Handoff. Such an event results in the change of one or more of the HA/LMA-Accounting mobility extension/option value(s). Or some other event occurs that results in the change of one or more HA/LMA-Accounting mobility extension/option value(s).

B.13 Triggered by the event in Step B12, that results in the change of one or more HA/LMA-Accounting mobility extension/option value(s), the PDSN 706 sends a PMIPv4 Registration Request/PMIPv6 Binding Update message to the HA/LMA 808. The PDSN 706 includes the HA/LMA-Accounting mobility extension(s)/option(s), e.g., disclosed in this document, whose value(s) have changed as a result of the event in step B12, in the PMIPv4 Registration Request/ PMIPv6 Binding Update message. For an event trigger (step B12) due to a handoff; the Packet-Data-Connection-Type mobility extension/option is set to: 'Handoff' or 'Fast Handoff', as the case may be. For another event trigger type, appropriate setting of the Packet-Data-Connection-Type mobility extension/option value is used.

B.14 On successful validating the PRRQ/PBU the HA/LMA 808 sends PMIPv4 Registration Reply/PMIPv6 Binding Update message to the PDSN 706.

The accounting client in the HA/LMA 808 and the HAAA 710 RADIUS server exchange Accounting-Request/Response (Stop/Start/Interim-Update) messages as required by the accounting triggers in step B13.

B.15 An event such as a handoff occurs resulting in disconnect of an A10 or P-P connection at the PDSN 706 for the same packet data session. Such an event results in the change of one or more of the HA/LMA-Accounting mobility extension/option value(s). Or some other event occurs that results in the change of one or more HA/LMA-Accounting mobility extension/option value(s).

B.16 Triggered by the event in Step B15, that results in the change of one or more HA/LMA-Accounting mobility extension/option value(s), the PDSN 706 sends a PMIPv4 Registration Request/PMIPv6 Binding Update message to the HA/LMA. The PDSN 706 includes the HA/LMA-Accounting mobility extension(s)/option(s), whose value(s) have changed as a result of the event in step B15 in the PMIPv4 Registration Request/PMIPv6 Binding Update message. For an event trigger (step B15) due to a handoff/disconnect of an A10 or P-P connection; the Packet-Data-Connection-Type mobility extension/option is set to: 'Handoff'. For another event trigger type, appropriate setting of the Packet-Data-Connection-Type mobility extension/option value is used.

B.17 The accounting client in the HA/LMA and the HAAA 710 RADIUS server exchange Accounting-Request/Response (Stop/Start/Interim-Update) messages as required by the accounting triggers in step B15.

B.18 User session terminates due to expiry of PMIP binding or explicit termination of the packet data session.

B.19 The HA/LMA sends an Accounting-Request (Stop) message with Session Continue attribute set to 'False' to terminate the accounting session with the RADIUS server B.20 RADIUS server responds with an Accounting-Response message.

Figure 9:
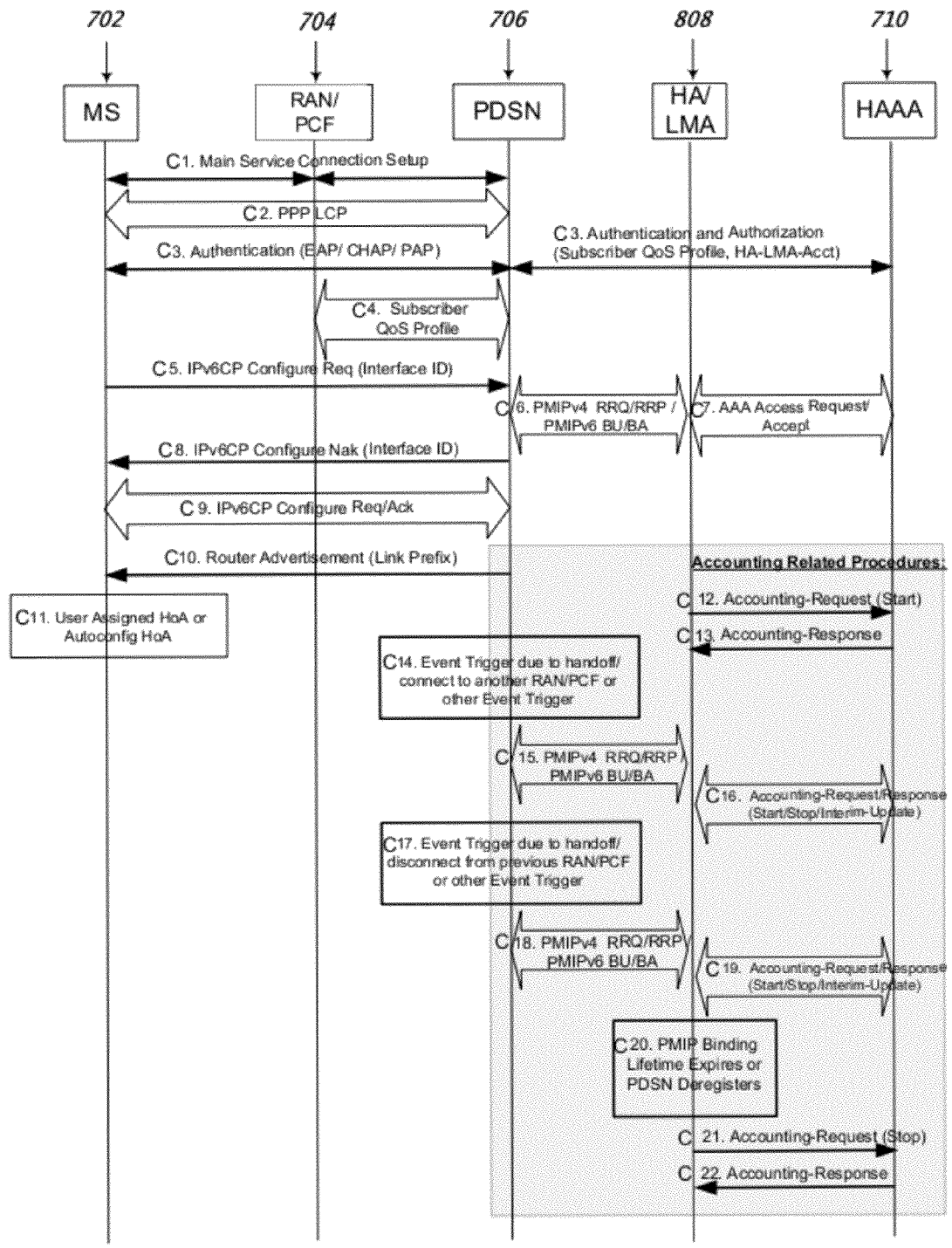
FIG. 9 is a block diagram showing example messages exchanged for accounting at HA/LMA for IPv6 addressing with Proxy MIP (PMIPv6).

With reference to FIG. 9, accounting procedures at Local Mobility Anchor for IPv6 (RFC2460) with network PMIPv4/ v6 operation mode are illustrated below. Network Proxy MIP procedures for both PMIPv4 and PMIPv6 are similar as specified in X.S0061.

This call flow illustration shows the use of PMIP Registration Request and/or PMIP Binding Update messages for conveying mobile station identity and RAN/AN related parameters from the PDSN 706 to the HA/LMA; yet such information could be conveyed from the PDSN 706 to the HA/LMA by the use of any other suitable messaging scheme between the PDSN 706 and the HA/LMA. Examples of such other messaging schemes would be, but not limited to the use of AAA RADIUS messages and associated Attributes; or AAA Diameters messages and associated AVPs.

C1. The Main Service Connection is setup.

C2. PPP LCP negotiation occurs and authentication protocol is selected.

C3. Access authentication and authorization is performed using the selected authentication protocol. The MS 702 exchanges authentication related messages with the PDSN 706. In turn, the PDSN 706 performs authentication and authorization with the HAAA 710 using AAA Access Request/Accept messages. If the PDSN 706 supports Accounting at the HA/LMA, the PDSN 706 includes HA-LMA-Accounting-Mode RADIUS VSA with value set to 'True' in the AAA Access Request message.

Once the authorization is successful, information such as Subscriber QoS Profile is returned to the PDSN 706 in AAA Access Accept message. If Accounting at the HA/LMA is supported for the MS 702, the HAAA 710 returns HA-LMA-Accounting-Mode RADIUS VSA with value set to 'True' in the Access Accept message. If accounting at HA/LMA is not authorized for the MS 702, the HA-LMA-Accounting-Mode RADIUS VSA is not included in the Access Accept message or it is included with value set to 'False'. Depending on operator policy, in the Access Accept message the HAAA 710 returns the Supported Accounting Triggers RADIUS VSA also indicating the authorized HA/LMA Accounting Triggers. The HAAA 710 also indicates network PMIP support for the MS 702 and returns the assigned HA/LMA address, Network-PMIP-NAI, PMN-HA key and PMN-HA-SPI information to the PDSN 706. /64 PPP link prefix for IPv6 operation may also be assigned by the HAAA 710.

C4. The PDSN 706 passes the relevant attributes received in Subscriber QoS Profile to the RAN.

C5. The MS 702 sends an IPv6CP Configure Request message with Interface ID configuration option to the PDSN 706. The PDSN 706 allocates an Interface ID to the MS 702. /64 PPP link prefix is assigned to the MS 702 as per Proxy Mobile IPv4/v6 procedures performed in Steps C6 and C7.

C6. The PDSN 706 generates MN-HA/LMA Authentication Extension and sends a PMIPv4 Registration Request/ PMIPv6 Binding Update message to the HA/LMA for establishing a PMIPv4/v6 tunnel between the PDSN 706 and the HA/LMA. 3GPP2 X.S0061 provides details on the construction of PMIPv4 Registration Request/PMIPv6 Binding Update message. In case the PDSN 706 supports Accounting at the HA/LMA and the HAAA 710 authorizes Accounting at the HA/LMA for this MS 702 (step C3), the PDSN 706 includes HA-LMA-Accounting-Mode mobility extension with value set to 'True' in the PMIPv4 Registration Request/ PMIPv6 Binding Update message. In this case, the PDSN 706 includes the mobility extensions/options specified for HA/LMA Accounting in the PMIPv4 Registration Request/ PMIPv6 Binding Update message, with Packet-Data-Connection-Type mobility extension/option set to 'Session Setup'.

Upon receiving PMN-HA/LMA key from the HAAA 710 and successfully authenticating the PRRQ/PBU (see Step C7), the HA/LMA sends PMIPv4 Registration Reply/ PMIPv6 Binding Acknowledgment message to the PDSN 706 that includes the /64 PPP link prefix assigned to the MS 702. In turn, the PDSN 706 passes the assigned Interface Identifier to the MS 702 as per IPv6CP procedures performed in Steps C8 and C9. The PDSN 706 stores the HA-LMA Accounting-Mode value (True in this case) and Supported Accounting Triggers if received in the PMIPv4 Registration Reply/PMIPv6 Binding Acknowledgment message.

C7. The HA/LMA sends AAA Access Request to the HAAA 710 to verify the received PRRQ/PBU message. If the PDSN 706 includes HA-LMA-Accounting-Mode mobility extension with value set to 'True', and the HA also supports Accounting at the HA/LMA, the HA includes HA-LMA-Accounting-Mode RADIUS VSA with value set to 'True' in the Access Request message.

The HAAA 710 retrieves the PMN-HA/LMA key using the PMN-HA/LMA-SPI and sends AAA Access Accept to the HA/LMA. The PMN-HA/LMA key and the PMN-HA/LMA-SPI are included in the AAA Access Accept. If Accounting at HA/LMA is supported for the MS 702, the HAAA 710 returns HA-LMA-Accounting-Mode RADIUS VSA with value set to 'True' in the Access Accept message. If accounting at HA/LMA is not authorized for the MS 702, the HA-LMA-Accounting-Mode RADIUS VSA is not included in the Access Accept message or it is included with value set to 'False'. Depending on operator policy, in the Access Accept message the HAAA 710 returns the Supported Accounting Triggers RADIUS VSA also indicating the authorized HA/LMA Accounting Triggers. The HA/LMA stores the HA-LMA Accounting value (True in this case) and Supported Accounting Triggers.

C8. The PDSN 706 sends an IPv6CP Configure Nak message that includes the assigned Interface Identifier to the MS 702.

C9. The MS 702 and the PDSN 706 perform IPv6CP procedures for the allocation of Interface Identifier. The MS 702 and the PDSN 706 construct the link-local IPv6 address by pre-pending the link-local prefix FE80::/64 to the negotiated IID. 3GPP2 X.S0061 provides the relevant details.

C10. The PDSN 706 transmits initial unsolicited Router Advertisement (RA) messages on the PPP link using its link-local address as the source address. The PDSN 706 includes the allocated /64 link prefix in the RA message to the MS 702.

C11. The MS 702 constructs global IPv6 address by pre-pending the /64 PPP link prefix received in the Router Advertisement messages to the Interface Identifier negotiated during the IPv6CP negotiations, or to the Interface Identifiers generated using techniques defined in RFC 3041.

The following procedures are applicable if Accounting at HA/LMA is supported both at the HA/LMA and the PDSN 706 and Accounting at HA/LMA is authorized for this MS 702. The HA/LMA learns about support for Accounting at HA/LMA at Step C7 above. The PDSN 706 learns about support for Accounting at HA/LMA at Step C6 above.

C12. If Accounting at HA/LMA is supported for the MS 702 (step C7), the HA/LMA constructs a UDR based on HA-Accounting mobility extensions/options received in step C6. The HA/LMA forwards the constructed UDR to the HAAA 710 RADIUS server in an Accounting-Request (Start) message.

C13. The RADIUS server responds with an Accounting-Response message.

C14. An event such as a handoff to another RAN/PCF occurs resulting in the setup of a new A10 or P-P connection at the PDSN 706 for the same packet data session. The handoff could be due to intra-PDSN or a Fast Handoff. Such an event results in the change of one or more of the HA/LMA-Accounting mobility extension/option value(s). Or some other event occurs that results in the change of one or more HA/LMA-Accounting mobility extension/option value(s).

C15. Triggered by the event in Step C14, that results in the change of one or more HA/LMA-Accounting mobility extension/option value(s), the PDSN 706 sends a PMIPv4 Registration Request/PMIPv6 Binding Update message to the HA/LMA. The PDSN 706 includes the HA/LMA-Accounting mobility extension(s)/option(s), whose value(s) have changed as a result of the event in step C14, in the PMIPv4 Registration Request/PMIPv6 Binding Update message. For an event trigger (step C14) due to a handoff; the Packet-Data-Connection-Type mobility extension/option is set to: 'Handoff' or 'Fast Handoff', as the case may be. For another event trigger type, appropriate setting of the Packet-Data-Connection-Type mobility extension/option value is used.

On successful validating the PRRQ/PBU message the HA/LMA sends PMIPv4 Registration Reply/PMIPv6 Binding Update message to the PDSN 706.

C16. The accounting client in the HA/LMA and the HAAA 710 RADIUS server exchange Accounting-Request/Response (Stop/Start/Interim-Update) messages as required by the accounting triggers in step C15.

C17. An event such as a handoff occurs resulting in disconnect of an A10 or P-P connection at the PDSN 706 for the same packet data session. Such an event results in the change of one or more of the HA/LMA-Accounting mobility extension/option value(s). Or some other event occurs that results in the change of one or more HA/LMA-Accounting mobility extension/option value(s).

C18. Triggered by the event in Step C17, that results in the change of one or more HA/LMA-Accounting mobility extension/option value(s), the PDSN 706 sends a PMIPv4 Registration Request/PMIPv6 Binding Update message to the HA/LMA. The PDSN 706 includes the HA/LMA-Accounting mobility extension(s)/option(s), whose value(s) have changed as a result of the event in step C17 in the PMIPv4 Registration Request/PMIPv6 Binding Update message. For an event trigger (step C17) due to a handoff/disconnect of an A10 or P-P connection; the Packet-Data-Connection-Type mobility extension/option is set to: 'Handoff'. For another event trigger type, appropriate setting of the Packet-Data-Connection-Type mobility extension/option value is used.

C19. The accounting client in the HA/LMA and the HAAA 710 RADIUS server exchange Accounting-Request/Response (Stop/Start/Interim-Update) messages as required by the accounting triggers in step C17.

C20. User session terminates due to expiry of PMIP binding or explicit termination of the packet data session.

C21. The HA/LMA sends an Accounting-Request (Stop) message with Session Continue attribute set to 'False' to terminate the accounting session with the RADIUS server.

C22. RADIUS server responds with an Accounting-Response message

The HA/LMA creates a UDR for each IPv4 and IPv6 address assigned to the MS 702. Data Octet Count (Originating) and Data Octet Count (Terminating) parameters is used for the count of the total number of octets received from and sent to the user for each assigned IPv4 and/or IPv6 address. Inbound MIP Signaling Octet Count and Outbound MIP Signaling Octet Count parameters is used for the count of PMIP signaling related octets for the MS 702.

Each packet data session for an MS 702 is identified by the MSID and the associated IPv4 or IPv6 address. Each packet data session may be assigned a Correlation ID by the HA/LMA. Use of a Correlation ID allows multiple accounting events for that packet data session to be correlated. Simultaneous IPv4 and IPv6 sessions for the same MS 702 use separate Correlation IDs.

All UDR information is stored and transmitted per tuple of {assigned IPv4 address or IPv6 Prefix, MSID, Account Session ID, Correlation ID}. During the lifetime of a packet data session, a UDR is created, modified, maintained, copied and deleted based on the packet data session related events at the HA/LMA. The HA/LMA creates a UDR when a packet data session is established and closes the UDR when the corresponding packet data session is terminated.

At the time of the establishment of a packet data session, a UDR is created and initialized from the 'Session-Setup' related Mobile Station Parameter Record (HA/LMA-Accounting mobility extension/option value(s)) received from the PDSN 706. Correlation ID and Account Session ID values are allocated for the packet data session. The HA/LMA sends an Accounting-Request message with a 'Start' indication and the Beginning Session parameter set to 'True' to the RADIUS server.

Some events cause certain UDR fields to change in the middle of a packet data session. These events could be associated with the mobility of the MS 702 resulting in updated Mobile Station Parameter Records (HA/LMA-Accounting mobility extension/option value(s)) being sent by the PDSN 706. Some examples of the supported Mobile Station Parameter Records are listed in this document. On the receipt of a PRRQ/PBU message containing a Mobile Station Parameter Record the following actions are taken by the HA/LMA:

Based on the MS 702 identity (such as MSID), identify the Mobility Binding Entry (MBE), the packet data session(s) that are active for the MS 702 and the associated UDRs.

Create new UDRs for all packet data sessions for the MS 702 by copying data from the previously identified UDRs. Packet count related parameters in the new UDRs are initialized to zero. This is followed by over-writing the new UDR parameters with those received in the Mobile Station Parameter Record. New Account Session IDs are assigned to the new UDRs, while the originally assigned Correlation IDs are maintained.

Send a RADIUS Accounting-Request (Stop) record for the old UDRs to capture the accounting data before the event identified by the Mobile Station Parameter Record. Session Continue parameter is set to 'True' in the Accounting-Request 'Stop' message. The old UDRs are closed.

Send a RADIUS Accounting-Request (Start) record for new UDRs that contain new UDR parameter values. The Beginning Session parameter is set to 'False' in the Accounting-Request 'Start' message.

The HA/LMA sends the same Correlation ID in both the Accounting-Request 'Start' and 'Stop' messages. The Account Session ID is used to match an Accounting-Request 'Start' and 'Stop' pair for the packet data session.

The HA/LMA may send a RADIUS Accounting-Request 'Stop' and RADIUS Accounting-Request 'Start' message pair anytime during a single packet data session as long as no accounting data is lost.

An implementation can choose to use a RADIUS Accounting-Request with an 'Interim-Update' indication instead of using an Accounting-Request Stop/Start pair to mark the occurrence of an event.

The following events cause the HA/LMA to take an accounting related action.
Setup PMIPv4/v6 Tunnel for a New Packet Data Session
Setup PMIPv4/v6 Tunnel for an Existing Packet Data Session
Refresh PMIPv4/v6 Tunnel Without Mobile Station Parameter Records
Refresh PMIPv4/v6 Tunnel With Mobile Station Parameter Records
Terminate Packet Data Session
User Data transmission through the HA/LMA
Interim-Update Record Trigger
Stop Record Trigger
Time-of-Day Timer Expiry
PDSN Procedures The PDSN 706 receives airlink parameters from the RAN/AN at the time of the establishment of a packet data session and at the occurrence of other events defined in X.S0011-005 specification. If accounting at the HA/LMA is negotiated by the appropriate settings of the HA-LMA-Accounting-Mode VSA, the PDSN 706 forwards subscriber identity, subscriber location and packet data session related parameters to the HA/LMA in Mobile Station Parameter Records to enable accounting UDRs at the HA/LMA. Such parameters are forwarded in PMIPv4 Registration Request/PMIPv6 Binding Update messages via. Mobility Extensions/Mobility Options.

If the PDSN 706 does not receive the HA-LMA-Accounting-Mode VSA in the Access-Accept message or the HA-LMA-Accounting-Mode VSA indicates accounting at HA/LMA not supported; the PDSN 706 silently discards the Supported-Accounting-Triggers attribute if received in AAA Access Accept message.

The following events cause the PDSN 706 to forward subscriber and packet data session related parameters to the HA/LMA by the use of Mobile Station Parameter Records:
Packet Data Session Setup or Inter-PDSN Handoff (Session-Setup)
Intra-PDSN Handoff (Handoff)
Fast Handoff (Fast-Handoff)

Example definitions the parameters forwarded by the PDSN 706 to the HA/LMA at the occurrence of the above stated events are presented below.

Packet Data Session Setup or Inter-PDSN Handoff (Session-Setup)

During the setup of an A10 connection (initial packet data session setup or inter-PDSN handoff), the PDSN 706 receives A10 Connection Setup and Active Start Airlink Records from the serving RAN/AN. At the time of establishing the PMIPv4/v6 tunnel, the PDSN 706 forwards the parameters listed in Table 1 in a PMIPv4 Registration Request/PMIPv6 Binding Update message to the HA/LMA.

TABLE 1

'Session-Setup' Mobile Station Parameter Record for Supporting Accounting at the HA/LMA

| Item | Parameter | Description | M/O/C Note-1 | Source |
|------|-----------|-------------|--------------|--------|
|  | Packet-Data-Event-Type | Indicates the packet data session related 'event' occuring at the PDSN. Packet Data Event Type set to 'Session-Setup'. | M | PDSN |
| M-A1 | MSID | MS ID (e.g., IMSI, MIN, IRM) | M | RAN/AN |
| M-A2 | ESN | Electronic Serial Number | M | RAN/AN |
| M-A3 | MEID | Mobile Equipment Identifier | M | RAN/AN |
| M-D4 | BSID | SID + NID + Cell Identifier type 2. | C Note-2 | RAN/AN |
| M-D7 | Subnet | The subnet information for HRPD. | C Note-2 | RAN/AN |

TABLE 1-continued

'Session-Setup' Mobile Station Parameter Record for Supporting Accounting at the HA/LMA

| Item | Parameter | Description | M/O/C Note-1 | Source |
|---|---|---|---|---|
| M-D8 | Carier-ID | A string that uniquely identifies the access network carrier that is providing PDSN services to the mobile station. | M | PDSN |
| M-E1 | User Zone | Tiered Services user zone. | M | RAN/AN |
| M-E2 | GMT-Time-Zone-Offset | A four octet string interpreted as a signed integer that indicates the offset in seconds from GMT time at PDSN | M | PDSN |
| M-F5 | Service Option | CDMA service option as received from the RAN. | M | RAN/AN |
| M-F15 | Always On | Specifies the status of Always On service. | M | PDSN |
| M-D11 | PDSN RADIUS Client Address | The IPv4 address of the RADIUS client at the PDSN. Set to the value that the PDSN reports to the AAA in NAS-IP Address parameter. | C Note 3 Note 5 | PDSN |
| M-D12 | PDSN IPv6 RADIUS Client Address | The IPv6 address of the RADIUS client at the PDSN. Set to the value that the PDSN reports to the AAA in NAS-IPv6 Address parameter. | C Note 3 Note 5 | PDSN |
| M-D13 | PDSN Identifier | NAS Identifier used during authenticaion between the PDSN and AAA. | C Note 4 Note 5 | PDSN |

Note-1: M/O/C—Mandatory/Optional/Conditional
Note-2: Either M-D4 or M-D7 included.
Note 3: Either M-D11 or M-D12 included if used during authentication between the PDSN and the AAA.
Note 4: M-D13 included if used during authentication between the PDSN and the AAA.
Note 5: Either parameter D11/D12 or parameter D13 is present.

Intra-PDSN Handoff (Handoff)

During intra-PDSN Handoff, the target RAN/AN establishes an A10 connection with the PDSN 706 for the ongoing packet data session, and the A10 connection with the source RAN/AN is released. The PDSN 706 receives A10 Connection Setup and Active Start Airlink Records from the Target RAN/AN. Based on the airlink parameters received from the Target RAN/AN, the PDSN 706 forwards the parameters listed in Table 2 in a PMIPv4 Registration Request/PMIPv6 Binding Update message to the HA/LMA.

TABLE 2

'Handoff' Mobile Station Parameter Record for Supporting Accounting at the HA/LMA

| Item | Parameter | Description | M/O/C Note-1 | Source |
|---|---|---|---|---|
| | Packet-Data-Event-Type | Indicates the packet data session related 'event' occuring at the PDSN. Packet Data Event Type set to 'Handoff'. | M | PDSN |
| M-A1 | MSID | MS ID (e.g., IMSI, MIN, IRM) | M | RAN/AN |
| M-A2 | ESN | Electronic Serial Number | O | RAN/AN |
| M-A3 | MEID | Mobile Equipment Identifier | O | RAN/AN |
| M-D4 | BSID | SID + NID + Cell Identifier type 2. | C Note-2 | RAN/AN |
| M-D7 | Subnet | The subnet information for HRPD. | C Note-2 | RAN/AN |
| M-D8 | Carier-ID | A string that uniquely identifies the access network carrier that is providing PDSN services to the mobile station. | O | PDSN |
| M-E1 | User Zone | Tiered Services user zone. | O | RAN/AN |
| M-E2 | GMT-Time-Zone-Offset | A four octet string interpreted as a signed integer that indicates the offset in seconds from GMT time at PDSN | O | PDSN |
| M-F5 | Service Option | CDMA service option as received from the RAN. | O | RAN/AN |
| M-F15 | Always On | Specifies the status of Always On service. | O | PDSN |
| M-D11 | PDSN RADIUS Client Address | The IPv4 address of the RADIUS client at the PDSN. Set to the value that the PDSN reports to the AAA in NAS-IP Address parameter. | O Note 3 Note 5 | PDSN |
| M-D12 | PDSN IPv6 RADIUS Client Address | The IPv6 address of the RADIUS client at the PDSN. Set to the value that the PDSN reports to the AAA in NAS-IPv6 Address parameter. | O Note 3 Note 5 | PDSN |

TABLE 2-continued

'Handoff' Mobile Station Parameter Record for
Supporting Accounting at the HA/LMA

| Item | Parameter | Description | M/O/C Note-1 | Source |
|---|---|---|---|---|
| M-D13 | PDSN Identifier | NAS Identifier used during authenticaion between the PDSN and AAA. | O Note 4 Note 5 | PDSN |

Note-1: M/O/C—Mandatory/Optional/Conditional
Note-2: Either M-D4 or M-D7 is included.
Note 3: Either M-D11 or M-D12 included if used during authentication between the PDSN and the AAA.
Note 4: M-D13 included if used during authentication between the PDSN and the AAA.
Note 5: If included, either parameter D11/D12 or parameter D13 is present.

Fast Handoff (Fast-Handoff)

During fast handoff, the target RAN/AN establishes an A10 connection with the target PDSN 706. The target PDSN 706 forwards the A10 Connection Setup and Active Start Airlink Records to the source PDSN 706 over the P-P Interface. Based on the airlink parameters received from the target PDSN 706, the source PDSN 706 forwards the parameters listed in Table 10.3 in a PMIPv4 Registration Request/PMIPv6 Binding Update message to the HA/LMA.

RADIUS Attributes

Table 4 shows the general Vendor Specific Format for all 3GPP2 RADIUS attributes. The Type and Vendor-ID are the same for every attribute. The vendor ID of 5535 is used to indicate 3GPP2.

TABLE 4

3GPP2 RADIUS Attribute Format

| 0 1 2 3 4 5 6 7 | 1 8 9 0 1 2 3 4 5 | 2 6 7 8 9 0 1 2 3 | 3 4 5 6 7 8 9 0 1 |
|---|---|---|---|
| Type | Length | Vendor-ID | |

TABLE 3

'Fast-Handoff' Mobile Station Parameter Record for
Supporting Accounting at the HA/LMA

| Item | Parameter | Description | M/O/C Note-1 | Source |
|---|---|---|---|---|
| | Packet-Data-Event-Type | Indicates the packet data session related 'event' occuring at the PDSN. Packet Data Event Type is set to 'Fast-Handoff'. | M | PDSN |
| M-A1 | MSID | MS ID (e.g., IMSI, MIN, IRM) | M | RAN/AN |
| M-A2 | ESN | Electronic Serial Number | O | RAN/AN |
| M-A3 | MEID | Mobile Equipment Identifier | O | RAN/AN |
| M-D4 | BSID | SID + NID + Cell Identifier type 2. | C Note-2 | RAN/AN |
| M-D7 | Subnet | The subnet information for HRPD. | C Note-2 | RAN/AN |
| M-D8 | Carier-ID | A string that uniquely identifies the access network carrier that is providing PDSN services to the mobile station. | M | PDSN |
| M-E1 | User Zone | Tiered Services user zone. | O | RAN/AN |
| M-E2 | GMT-Time-Zone-Offset | A four octet string interpreted as a signed integer that indicates the offset in seconds from GMT time at PDSN | M | PDSN |
| M-F5 | Service Option | CDMA service option as received from the RAN. | O | RAN/AN |
| M-F15 | Always On | Specifies the status of Always On service. | O | PDSN |
| M-D11 | PDSN RADIUS Client Address | The IPv4 address of the RADIUS client at the PDSN. Set to the value that the PDSN reports to the AAA in NAS-IP Address parameter. | C Note 3 Note 5 | PDSN |
| M-D12 | PDSN IPv6 RADIUS Client Address | The IPv6 address of the RADIUS client at the PDSN. Set to the value that the PDSN reports to the AAA in NAS-IPv6 Address parameter. | C Note 3 Note 5 | PDSN |
| M-D13 | PDSN Identifier | NAS Identifier used during authenticaion between the PDSN and AAA. | C Note 4 Note 5 | PDSN |

Note-1: M/O/C—Mandatory/Optional/Conditional
Note-2: Either M-D4 or M-D7 is included.
Note 3: Either M-D11 or M-D12 included if used during authentication between the PDSN and the AAA.
Note 4: M-D13 included if used during authentication between the PDSN and the AAA.
Note 5: Either parameter D11/D12 or parameter D13 is present.

TABLE 4-continued

3GPP2 RADIUS Attribute Format

| Vendor-ID (cont) | Vendor-Type | Vendor-Length |
|---|---|---|
| | Vendor-value | |

In some implementations, 3GPP2 RADIUS Attributes as specified in 3GPP2 X.S0011-005 specification may be supported. In addition the RADIUS attributes specified in this document may also be supported.

TABLE 5

3GPP2 Organization/Vendor Specific RADIUS VSAs

| VSA Name | VSA-Type | Instances of VSA Supported in Access Request | Instances of VSA Supported in Access Accept |
|---|---|---|---|
| HA-LMA-Accounting-Mode | 26/VS | 0-1 | 0-1 |
| Supported-Accounting-Triggers | 26/VS | 0 | 0-1 |

VS = Vendor Specific

HA-LMA-Accounting-Mode

The PDSN 706 includes this VSA in Access Request message to indicate the accounting-modes supported by the PDSN 706. In response, the AAA uses this VSA to indicate which accounting-modes to use for this MS 702.

The HA/LMA includes this VSA in Access Request message to indicate the accounting-modes supported by the HA/LMA. In response, the AAA uses this VSA to indicate which accounting-modes to use for this MS 702.

TABLE 6

| Type: | 26 |
|---|---|
| Length: | 12 octets |
| Vendor ID: | 5535 |
| Vendor-Type: | Vendor specific |
| Vendor-Length: | 6 |
| Vendor-Value: | Bitmap: Bit 0: Set to '1' to indicate HA/LMA Accounting Others: Reserved Set to '0' by the entity sending the VSA and ignored by the entity receiving the VSA. |

Supported-Accounting-Triggers

The AAA includes this VSA in Access Accept message to indicate the HA/LMA Accounting Triggers authorized for the MS 702. Absence of this VSA when Accounting at HA/LMA is supported implies that all triggers are active. This attribute is silently discarded when Accounting at HA/LMA is not authorized by the RADIUS server.

TABLE 7

| Type: | 26 |
|---|---|
| Length: | 12 octets |
| Vendor ID: | 5535 |
| Vendor-Type: | Vendor specific |
| Vendor-Length: | 6 |
| Vendor-Value: | Bitmap: Bit 0: Set to '1' to indicate 'Session-Setup' trigger Bit 1: Set to '1' to indicate 'Handoff' trigger Bit 2: Set to '1' to indicate 'Fast-Handoff' trigger Others: Reserved. Set to '0' by the entity sending the VSA and ignored by the entity receiving the VSA. |

Packet Data Parameters

Example 3GPP2 Organization/Vendor Specific mobility extensions and mobility options for supporting accounting at the HA/LMA are provided below. Mobility Extensions for supporting PMIPv4 procedures are also listed in this document. Mobility Options for supporting PMIPv6 procedures are also listed in this document.

MIPv4 Mobility Extensions

Some of the 3GPP2 Organization/Vendor Specific Mobility Extensions for PMIPv4 Registration Request message sent from the PDSN 706 to the Home Agent (HA) are listed in Table 8 below.

TABLE 8

3GPP2 Organization/Vendor Specific Mobility Extensions for supporting Accounting at the HA

| NVSE Name | NVSE-Type | Instances of NVSE Supported | Remarks |
|---|---|---|---|
| HA-LMA-Accounting-Mode | 134/VS | 0-1 | Values: 0 = False 1 = True |
| Packet-Data-Event-Type | 134/VS | 0-1 | Values: 1 = Session-Setup 2 = Handoff 3 = Fast-Handoff Others: Reserved |

VS = Vendor Specific

MIPv6 Mobility Options

Some of the 3GPP2 Vendor Specific Mobility Options (MOs) for PMIPv6 Binding Update message sent from the PDSN 706 to the Local Mobility Agent (LMA) are listed in Table 12.2 below.

TABLE 9

3GPP2 Organization/Vendor Specific Mobility Options for supporting Accounting at the LMA

| Mobility Option (MO) Name | MO-Type | Instances of MOs Supported | Remarks |
|---|---|---|---|
| HA-LMA-Accounting-Mode | 19/VS | 0-1 | Values: 0 = False 1 = True |
| Packet-Data-Event-Type | 19/VS | 0-1 | Values: 1 = Session-Setup 2 = Handoff 3 = Fast-Handoff Others: Reserved |

VS = Vendor Specific

Mobility Extensions and Mobility Options

Mobility Extensions

3GPP2 Organization/Vendor Specific Mobility Extensions for MIPv4 and PMIPv4 Registration Request message sent from the PDSN 706 to the Home Agent (HA) are formatted as Normal Vendor Specific Extensions (NVSE) specified in RFC 3025.

HA-LMA-Accounting-Mode

The HA-LMA-Accounting-Mode NVSE is used to convey the status of support for HA/LMA Accounting at the entity sending this NVSE. The format of the HA-LMA-Accounting-Mode NVSE is shown below in Table 10 and Table 11:

TABLE 10

Example HA-LMA-Accounting-Mode NVSE format

```
                    1                   2                   3
0 1 2 3 4 5 6 7  8 9 0 1 2 3  4 5  6 7 8 9 0 1 2 3  4 5 6 7 8 9 0 1
    Type            Length              Reserved
              3GPP2 Vendor/Organization ID
   NVSE-Type = VS             NVSE-Value = HA/LMA
                               Accounting Support
```

TABLE 11

| | |
|---|---|
| Type: | 134 |
| Length: | 10 octets |
| | Length of NVSE in octets, not including the Type and Length fields |
| Vendor ID: | 5535 |
| NVSE-Type: | Vendor specific |
| NVSE-Value: | This field indicates if HA/LMA Accounting is supported by the entity sending this NVSE. Supported values are:<br>0 = False<br>1 = True<br>Others: Reserved. |

Packet-Data-Event-Type

The Packet-Data-Event-Type NVSE is used to convey the packet data session related 'event' occurring at the PDSN 706 to the Home Agent. The format of the Packet-Data-Event-Type NVSE is shown below in Table 12 and Table 13:

TABLE 12

Packet-Data-Event-Type NVSE

```
                    1                   2                   3
0 1 2 3 4 5 6 7  8 9 0 1 2 3  4 5  6 7 8 9 0 1 2 3  4 5 6 7 8 9 0 1
    Type            Length              Reserved
              3GPP2 Vendor/Organization ID
   NVSE-Type = VS        NVSE-Value = Packet-Data-Event-Type
```

TABLE 13

| | |
|---|---|
| Type: | 134 |
| Length: | 10 octets |
| | Length of NVSE in octets, not including the Type and Length fields |
| Vendor/Org ID: | 5535 |
| NVSE-Type: | Vendor specific |
| NVSE-Value: | Bitmap<br>This field indicates the 'event' related to the Packet Data Session. Supported values are:<br>Bit 0: Set to '1' to indicate 'Session-Setup' trigger<br>Bit 1: Set to '1' to indicate 'Handoff' trigger<br>Bit 2: Set to '1' to indicate 'Fast-Handoff' trigger<br>Others: Reserved.<br>Set to '0' by the entity sending the NVSE and ignored by the entity receiving the NVSE. |

MIPv6 Mobility Options

3GPP2 Vendor Specific Mobility Options for PMIPv6 Binding Update message sent from the PDSN 706 to the Local Mobility Agent (LMA) have 4n+2 alignment requirements and are formatted as specified in RFC 5094.

HA-LMA-Accounting-Mode

The HA-LMA-Accounting-Mode mobility option is used to convey the status of support for HA/LMA Accounting at the entity sending this mobility option. The format of HA-LMA-Accounting-Mode mobility option is shown below in Table 14 and Table 15:

TABLE 14

HA-LMA-Accounting-Mode Mobility Option

```
                    1                   2                   3
0 1 2 3 4 5 6 7 8 9 0 1 2 3 4 5   6 7 8 9 0 1 2 3   4 5 6 7 8 9 0 1
                                       Type              Length
              3GPP2 Vendor/Organization ID
   MO Sub-Type = (TBD)      MO Data = HA/LMA Accounting Support
```

TABLE 15

| | |
|---|---|
| Type: | 19 |
| Length: | 8 octets.<br>Length of mobility option in octets, not including the Type and Length fields |
| Vendor/Org ID: | 5535 |
| MO-sub-Type: | Vendor specific |
| MO-Data: | This field indicates if HA/LM Accounting is supported by the entity sending this mobility option:<br>0 = False<br>1 = True<br>Others: Reserved |

Packet-Data-Event-Type

The Packet-Data-Event-Type mobility option is used to convey the packet data session related 'event' occurring at the PDSN 706 to the LMA. The format of the Packet-Data-Event-Type mobility option is shown below in Table 16 and Table 17:

TABLE 16

Packet-Data-Event-Type Mobility Option

```
                    1                   2                   3
0 1 2 3 4 5 6 7 8 9 0 1 2 3 4 5   6 7 8 9 0 1 2 3   4 5 6 7 8 9 0 1
                                       Type              Length
              3GPP2 Vendor/Organization ID
   MO Sub-Type = (TBD)       MO Data = Packet-Data-Event-Type
```

TABLE 17

| | |
|---|---|
| Type: | 19 |
| Length: | 8 octets.<br>Length of mobility option in octets, not including the Type and Length fields |
| Vendor/Org ID: | 5535 |
| MO-sub-Type: | Vendor specific |
| MO-Data: | Bitmap<br>This field indicates the 'event' related to the Packet Data Session. Supported values are:<br>Bit 0: Set to '1' to indicate 'Session-Setup' trigger<br>Bit 1: Set to '1' to indicate 'Handoff' trigger<br>Bit 2: Set to '1' to indicate 'Fast-Handoff' trigger<br>Others: Reserved. Set to '0' by the entity sending the MO and ignored by the entity receiving the MO. |

FIG. 10 is a flow chart representation of a process 1000 of facilitating wireless communications. At 1002, a registration request is received. At 1004, based on the received registration request, an accounting message indicating support of an accounting mode is transmitted. The registration request may, e.g., correspond to messages A6 or B3 or C3, as previously described. As previously discussed, in some embodiments, in response to the accounting message, an indication may be received of whether to perform further operations using the accounting mode (e.g., whether the accounting of a point-to-point connection is to be performed at the PDSN or at the HA/LMA).

FIG. 11 is a block diagram representation of a portion of a communications apparatus 1100 for facilitating wireless communications. The module 1102 is for authenticating a registration request from a mobile station. The module 1104 is used to transmit, based on the registration request, an accounting message indicating support of an accounting mode. In various embodiments, modules 1102, 1104 and apparatus 1100 are further configured to implement one or more techniques described in this document.

FIG. 12 is a flow chart representation of a process 1200 of facilitating wireless communications. At 1202, a registration message is received from a packet data service node (PDSN), indicating support for an accounting mode by the PDSN. At 1204, an accept message is transmitted to PDSN, indicating whether or not to use the accounting mode. In some embodiments, the process 1200 is implemented at the HAAA (RADIUS server).

FIG. 13 is a block diagram representation of a portion of an apparatus 1300 for facilitating wireless communications. The module 1302 is used to receive, from a packet data service node (PDSN), a registration message indicating support for an accounting mode by the PDSN. The module 1304 is used to transmit an accept message to the PDSN, indicating a quality of service (QoS) profile and whether or not to use the accounting mode. In various embodiments, modules 1302, 1304 and apparatus 1300 are further configured to implement one or more techniques described in this document.

Figures 14, 15:
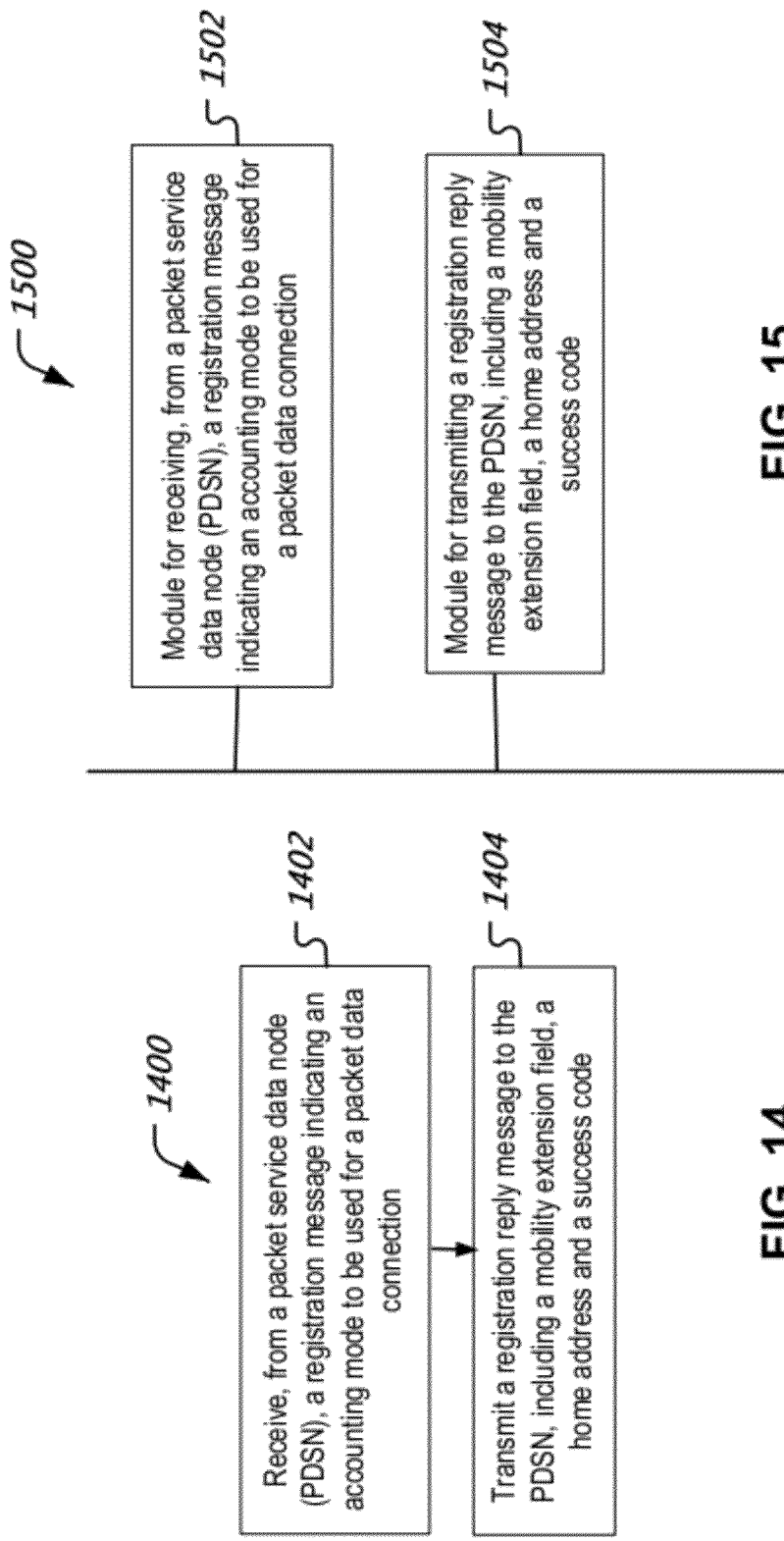
FIG. 14 is a flow chart representation of a process for facilitating wireless communications.
FIG. 15 is a block diagram representation of a portion of an apparatus for facilitating wireless communications.

FIG. 14 is a flow chart representation of a process 1400 of facilitating wireless communications. At 1402, a registration message is received from a packet data service node (PDSN), indicating an accounting mode to be used for a packet data connection. At 1404, a registration reply message is transmitted to the PDSN, including a mobility extension field, a home address and a success code.

FIG. 15 is a block diagram representation of a portion of an apparatus 1500 for facilitating wireless communications. The module 1502 is used to receive, from a packet data service node (PDSN), a registration message indicating an accounting mode to be used for a packet data connection. The module 1504 is used to transmit a registration reply message to the PDSN, including a mobility extension field, a home address and a success code. In various embodiments, modules 1502, 1504 and apparatus 1500 are further configured to implement one or more techniques described in this document.

It will be appreciated that the techniques disclosed in this document can be used, in one aspect, to delegate accounting responsibility for a packet data connection to an HA/LMA or a PDSN. In one aspect, a decision regarding where to perform accounting may be taken at the HAAA, based on a service provider policy, and communicated to the PDSN and/or the HA/LMA.

It will further be appreciated that the techniques used in this document can be useful to implement a service provider's accounting policy when a mobile station is roaming and is in a radio access network in which a packet data connection is controlled by a different service provider's PDSN.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A method for accounting management in wireless communications, comprising:
   receiving a registration request; and
   transmitting, based on the received registration request, an accounting message indicating support of an accounting mode;
   wherein the registration request includes an internet protocol control protocol (IPCP) configuration request message.

2. The method of claim 1, further comprising:
   receiving, in response to the accounting message, an indication of whether to perform further operations using the accounting mode.

3. The method recited in claim 1, wherein the registration request includes an indication for authenticating a mobile station.

4. The method recited in claim 1 wherein the registration request includes a Proxy mobile internet protocol (PMIP) registration request.

5. The method of claim 4, further comprising, when further operations are to be performed using the accounting mode, forwarding an accounting message comprising the PMIP registration request to a Home Agent/Local Mobility Anchor (HA/LMA).

6. The method of claim 4, further comprising, when further operations are to be performed using the accounting mode, forwarding an accounting message comprising a binding update to a Home Agent/Local Mobility Anchor (HA/LMA).

7. The method of claim 4, further comprising, when further operations are to be performed using the accounting mode, forwarding an accounting message comprising the PMIP registration request to a Home Agent/Local Mobility Anchor (HA/LMA).

8. The method of claim 4, further comprising, when further operations are to be performed using the accounting mode, forwarding an accounting message comprising a binding update to a Home Agent/Local Mobility Anchor (HA/LMA).

9. The method of claim 7, further comprising,
   exchanging, in response to an event trigger, messages as required by the event trigger.

10. The method of claim 9, wherein, when the event trigger is for a handoff to another radio access network, transmitting an update message to the HA/LMA.

11. The method of claim 9, wherein, when the event trigger is for a setup of a packet data session, transmitting an update message to the HA/LMA.

12. The method of claim 9, wherein, when the event trigger is for a disconnection of a peer to peer connection, transmitting an update message to the HA/LMA.

13. The method of claim 1, wherein the accounting message indicating support for the accounting mode include an accounting mode field having value set to "True."

14. The method of claim 2, further comprising performing accounting operations for a mobile station that originated the registration request.

15. An apparatus for accounting management in wireless communications, comprising:
   an authenticator for authenticating a registration request from a mobile station; and
   a transmitter that transmits, based on the registration request, an accounting message indicating support of an accounting mode; and
   wherein the registration request includes an internet protocol control protocol (IPCP) configuration request message.

16. The apparatus of claim 15, further comprising:
   an indication receiver that receives, in response to the accounting message, an indication of whether to perform further operations using the accounting mode.

17. The apparatus recited in claim 15, wherein the registration request includes an indication for authenticating a mobile station.

18. The apparatus recited in claim 15 wherein the registration request includes a Proxy mobile internet protocol (PMIP) registration request.

19. The apparatus of claim 18, further comprising, when further operations are to be performed using the accounting mode, a message forwarder for forwarding an accounting message comprising the PMIP registration request to a Home Agent/Local Mobility Anchor (HA/LMA).

20. The apparatus of claim 18, further comprising, when further operations are to be performed using the accounting mode, a message forwarder for forwarding an accounting message comprising a binding update to a Home Agent/Local Mobility Anchor (HA/LMA).

21. An apparatus for accounting management in wireless communications, comprising:
   means for receiving a registration request; and
   means for transmitting, based on the received registration request, an accounting message indicating support of an accounting mode;
   wherein the registration request includes an internet protocol control protocol (IPCP) configuration request message.

22. A computer program product comprising a non-volatile, computer-readable medium having code stored thereon, the code, when executed, causing a processor to implement a method, comprising:
   receiving a registration request; and
   transmitting, based on the received registration request, an accounting message indicating support of an accounting mode;
   wherein the registration request includes an internet protocol control protocol (IPCP) configuration request message.

23. A method of accounting management in wireless communications, comprising:
   receiving, from a packet data service node (PDSN), a registration message indicating support for an accounting mode by the PDSN; and
   transmitting an accept message to the PDSN, indicating whether or not to use the accounting mode; and exchanging, in response to an event trigger, messages as required by the event trigger;
wherein, when the event trigger is for a disconnection of a peer to peer connection, receiving an update message.

24. The method of claim 23, wherein the accept message indicating whether or not to use the accounting mode based on a value of a message field.

25. The method of claim 23, wherein the accept message indicating whether or not to use the accounting mode based on presence or absence of a message field.

26. An apparatus for accounting management in wireless communications, comprising:
a receiver module that receives, from a packet service data node (PDSN), a registration message indicating support for an accounting mode by the PDSN; and
a transmitter module that transmits an accept message to the PDSN, indicating a quality of service (QoS) profile and whether or not to use the accounting mode; and
a trigger exchange module that exchanges, in response to an event trigger, messages as required by the event trigger;
wherein, the receiver module is configured to receive an update message when the event trigger is for a disconnection of a peer to peer connection.

27. The apparatus of claim 26, wherein the accept message indicates whether or not to use the accounting mode based on a value of a message field.

28. The apparatus of claim 26, wherein the accept message indicates whether or not to use the accounting mode based on presence or absence of a message field.

29. An apparatus for accounting management in wireless communications, comprising:
means for receiving, from a packet service data node (PDSN), a registration message indicating support for an accounting mode by the PDSN; and
means for transmitting an accept message to the PDSN, indicating whether or not to use the accounting mode;
wherein the accept message indicating whether or not to use the accounting mode based on a value of a message field.

30. A computer program product comprising a non-volatile, computer-readable medium having code stored thereon, the code, when executed, causing a processor to implemented a method, comprising:
receiving, from a packet service data node (PDSN), a registration message indicating support for an accounting mode by the PDSN; and
transmitting an accept message to the PDSN, indicating whether or not to use the accounting mode;
wherein the accept message indicating whether or not to use the accounting mode based on presence or absence of a message field.

31. A method of facilitating wireless communications, comprising:
receiving, from a packet data service node (PDSN), a registration message indicating an accounting mode to be used for a packet data connection; and
transmitting a registration reply message to the PDSN, including a mobility extension field, a home address and a success code.

32. The method of claim 31, further including:
retrieving, based on the received registration message, a key used for authentication.

33. The method of claim 32, further comprising,
securing a portion of the mobility extension field using the key.

34. An apparatus for facilitating wireless communications, comprising:
a receiver module that receives, from a packet data service node (PDSN), a registration message indicating an accounting mode to be used for a packet data connection; and
a transmitter module that transmits a registration reply message to the PDSN, including a mobility extension field, a home address and a success code.

35. The apparatus of claim 34, further including:
a key module for retrieving, based on the received registration message, a key used for authentication.

36. The apparatus of claim 35, further comprising,
a security module for securing a portion of the mobility extension field using the key.

37. An apparatus for facilitating wireless communications, comprising:
means for receiving, from a packet service data node (PDSN), a registration message indicating an accounting mode to be used for a packet data connection; and
means for transmitting a registration reply message to the PDSN, including a mobility extension field, a home address and a success code.

38. A computer program product comprising a non-volatile, computer readable medium having code stored thereon, the code, when executed, causing a processor to implement a method, comprising:
receiving, from a packet service data node (PDSN), a registration message indicating an accounting mode to be used for a packet data connection; and
transmitting a registration reply message to the PDSN, including a mobility extension field, a home address and a success code.

39. A system for facilitating wireless communications, comprising:
a packet data service node (PDSN) configured to:
receive a registration request; and
transmit, based on the received registration request, an accounting message indicating support of an accounting mode;
a home authentication, authorization and accounting (HAAA) server configured to:
receive, from the PDSN, the registration request; and
transmit an accept message to the PDSN, indicating whether or not to use the accounting mode; and
a home agent/local mobility agent (HA/LMA) configured to:
receive, from the PDSN, a registration message indicating an accounting mode to be used for a packet data connection; and
transmit a registration reply message to the PDSN, including a mobility extension field, a home address and a success code.

40. The method recited in claim 1, wherein the internet protocol control protocol (IPCP) comprises internet protocol version 6 control protocol (IPv6CP).

41. A method for accounting management in wireless communications, comprising:
receiving a registration request; and
transmitting, based on the received registration request, an accounting message indicating support of an accounting mode; and
the accounting message indicating support for the accounting mode include an accounting mode field having value set to "True."

42. The apparatus recited in claim 15, wherein the internet protocol control protocol (IPCP) comprises internet protocol version 6 control protocol (IPv6CP).

43. A method of accounting management in wireless communications, comprising:
- receiving, from a packet data service node (PDSN), a registration message indicating support for an accounting mode by the PDSN; and
- transmitting an accept message to the PDSN, indicating whether or not to use the accounting mode;
- wherein the accept message indicating whether or not to use the accounting mode based on a value of a message field.

44. A method of accounting management in wireless communications, comprising:
- receiving, from a packet data service node (PDSN), a registration message indicating support for an accounting mode by the PDSN; and
- transmitting an accept message to the PDSN, indicating whether or not to use the accounting mode;
- wherein the accept message indicating whether or not to use the accounting mode based on presence or absence of a message field.

45. An apparatus for accounting management in wireless communications, comprising:
- a receiver module that receives, from a packet service data node (PDSN), a registration message indicating support for an accounting mode by the PDSN; and
- a transmitter module that transmits an accept message to the PDSN, indicating a quality of service (QoS) profile and whether or not to use the accounting mode;
- wherein the accept message indicates whether or not to use the accounting mode based on a value of a message field.

46. An apparatus for accounting management in wireless communications, comprising:
- a receiver module that receives, from a packet service data node (PDSN), a registration message indicating support for an accounting mode by the PDSN; and
- a transmitter module that transmits an accept message to the PDSN, indicating a quality of service (QoS) profile and whether or not to use the accounting mode;
- wherein the accept message indicates whether or not to use the accounting mode based on presence or absence of a message field.

\* \* \* \* \*